US006487617B1

(12) United States Patent
Gates

(10) Patent No.: US 6,487,617 B1
(45) Date of Patent: Nov. 26, 2002

(54) SOURCE-DESTINATION RE-TIMED COOPERATIVE COMMUNICATION BUS

(75) Inventor: Stillman Gates, Los Gatos, CA (US)

(73) Assignee: Adaptec, Inc., Milipitas, CA (US)

( * ) Notice: Subject to any disclaimer, the term of this patent is extended or adjusted under 35 U.S.C. 154(b) by 69 days.

(21) Appl. No.: 09/651,166

(22) Filed: Aug. 30, 2000

Related U.S. Application Data

(63) Continuation of application No. 09/088,812, filed on Jun. 2, 1998, now Pat. No. 6,157,971.

(51) Int. Cl.[7] .............................................. G06F 13/00
(52) U.S. Cl. ...................... 710/100; 710/1; 710/2; 710/4; 710/5; 710/25; 710/110; 710/118; 710/119; 710/126; 710/127; 710/129; 712/25; 712/31; 712/33; 712/704
(58) Field of Search ................................ 710/100, 1, 2, 710/4, 5, 25, 110, 118, 119, 126, 127, 129; 712/25, 31, 33, 204

(56) References Cited

U.S. PATENT DOCUMENTS

| 4,558,429 A | | 12/1985 | Barlow et al. ............... 711/157 |
|---|---|---|---|
| 4,841,435 A | * | 6/1989 | Papenberg ................... 710/53 |
| 5,136,595 A | * | 8/1992 | Kimura ........................ 714/47 |
| 5,247,644 A | * | 9/1993 | Johnson et al. .............. 711/157 |
| 5,363,119 A | * | 11/1994 | Snyder et al. ................ 345/668 |
| 5,398,244 A | | 3/1995 | Mathews et al. ............ 370/448 |
| 5,506,995 A | | 4/1996 | Yoshimoto et al. .......... 710/107 |
| 5,544,334 A | | 8/1996 | Noll ............................ 710/129 |
| 5,559,750 A | | 9/1996 | Dosaka et al. .......... 365/230.06 |
| 5,659,690 A | * | 8/1997 | Stuber et al. ................ 710/307 |
| 5,822,550 A | | 10/1998 | Milhaupt et al. ............ 710/126 |
| 5,826,106 A | * | 10/1998 | Pang ............................ 710/25 |
| 5,850,541 A | * | 12/1998 | Sugimoto .................... 713/601 |
| 5,915,103 A | * | 6/1999 | Chambers et al. ........... 710/313 |
| 6,065,092 A | * | 5/2000 | Roy ............................... 711/5 |
| 6,097,218 A | * | 8/2000 | Callicott et al. .............. 326/82 |
| 6,195,593 B1 | * | 2/2001 | Nguyen ....................... 700/97 |

* cited by examiner

Primary Examiner—Ayaz Sheikh
Assistant Examiner—Frantz B. Jean
(74) Attorney, Agent, or Firm—Gunnison, McKay & Hodgson, L.L.P.; Forrest Gunnison

(57) ABSTRACT

A source module, a destination module, or both modules, that are used in a data transfer, signal over an internal communication bus to a bus master when the addressed storage location in the data transfer comprises a single point address type memory, the addressed module drives an active signal on an address increment disable line in the control bus. In response to the active signal on the address increment disable line, the bus master inhibits changing the address for the duration of the data transfer. The module also drives an active signal on an expansion address off boundary line in the control bus when an internal expansion address of the module is not aligned with a natural boundary of a data bus of the internal communication bus to allow the bus master to adjust the width of the data transfer.

18 Claims, 10 Drawing Sheets

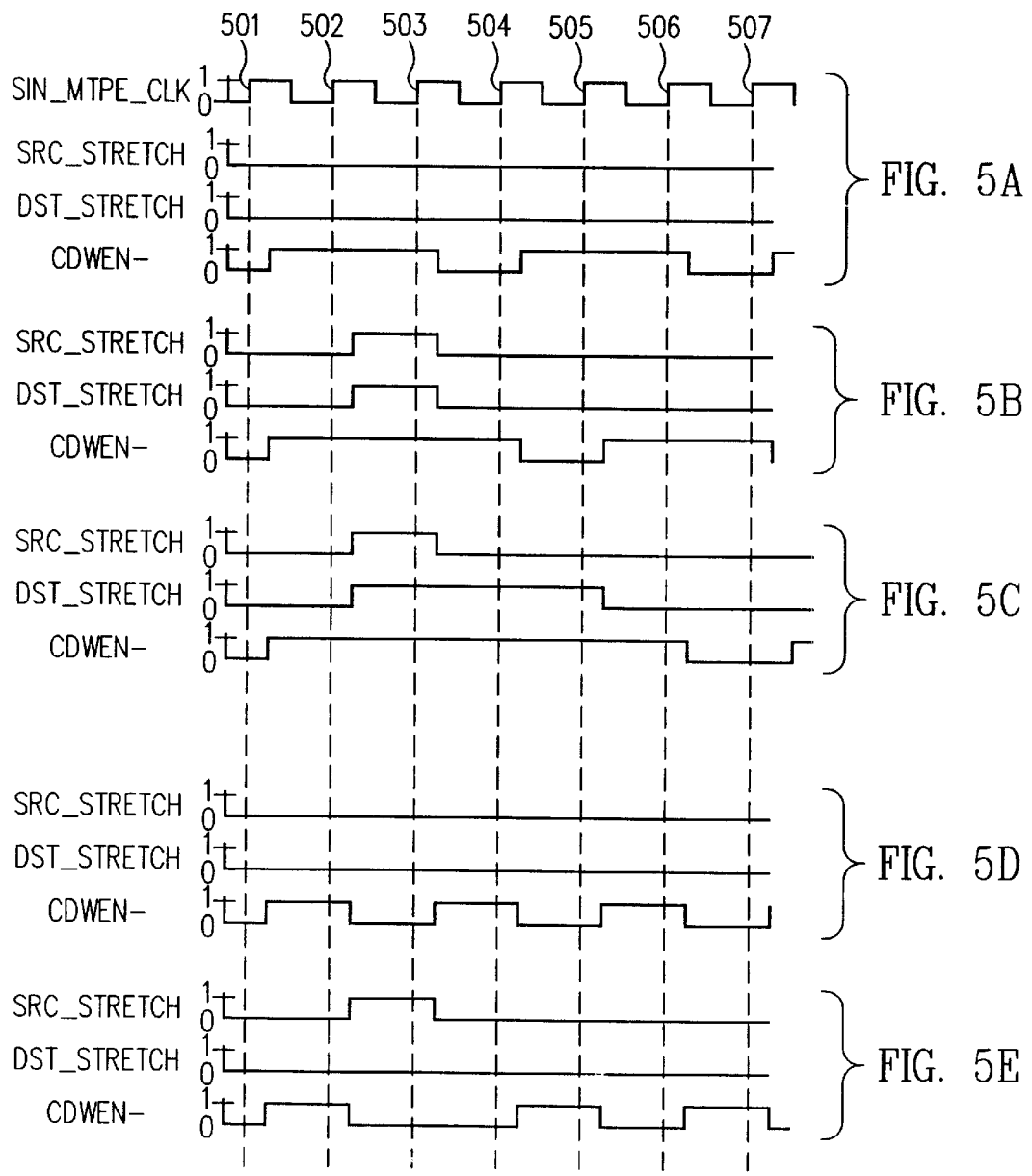

SOURCE-DESTINATION RE-TIMED COOPERATIVE COMMUNICATION BUS

This application is a continuation of U.S. patent application Ser. No. 09/088,812, filed on Jun. 2, 1998, now U.S. Pat. No. 6,157,971 issued on Dec. 5, 2000, which is incorporated herein by reference in its entirety.

BACKGROUND OF THE INVENTION

1. Field of the Invention

This invention relates generally to interfacing modules in host or device adapters, and in particular to bus structures and methods for interconnecting modules within a multiple I/O bus interface integrated circuit.

2. Description of Related Art

Prior single chip host adapters have included a plurality of modules and an on-chip processor that controls operation of the modules. For example, U.S. Pat. No. 5,659,690, entitled "Programmably Configurable Host Adapter Integrated Circuit Including a RISC Processor," issued on Aug. 19, 1997 to Stuber et al., which is incorporated herein by reference, had an internal bus that coupled the various modules to a sequencer that included a RISC processor.

Specifically, a SCSI module 130 (FIG. 1), a sequencer 120, data FIFO memory circuit 160, a memory 140, and a host interface module 110 were interconnected by an internal chip I/O bus CIOBUS, which was used for control of host adapter integrated circuit 100 both by a host microprocessor 170 through a host adapter driver 165 and by sequencer 120. The internal chip I/O bus CIOBUS included (i) a source bus with separate eight bit address and data buses, (ii) a destination bus with separate eight bit address and data buses, and (iii) a plurality of control signal lines, i.e., a chip source read enable line CSREN-, a chip destination write enable line CDWREN-, and a bus busy line CRBUSY. Internal chip I/O bus CIOBUS supported high speed normal operations that were controlled by sequencer 320 as well as slower but extended operations during error recovery that were controlled by the host adapter driver using the host microprocessor.

The splitting of the internal chip I/O bus CIOBUS into source and destination buses allowed each sequencer instruction to be completed in a single sequencer clock cycle, as opposed to the multiple cycles needed on a shared bus. Further, in some cases, a write operation and a read operation were performed simultaneously over internal chip I/O bus CIOBUS.

One problem encountered in implementing such a host adapter with an internal chip I/O bus CIOBUS is including hardware logic on the chip which controls the number of bus clock cycles for a particular module to complete a transaction over the internal bus. The. predicted performance of a particular module is not known until late in the design process because the performance of the module is dependent upon resources on the chip that the module must use. Consequently, the hardware logic necessary to control the number of bus clock cycles cannot be designed until the design of all the modules is complete. This inhibits parallel design efforts of the complete chip and introduces delays in the time to market.

In addition, some circuits may perform somewhat differently from that predicted during design. Consequently, the hardware circuit that controls the number of bus clock cycles may not be adequate. This typically requires either fabrication of a new chip, or alternatively a software design around which permits operation of the module, but results in reduced performance. Typically, the software design around included a sequence of no operation instructions in the firmware for the on-chip sequencer. A method and structure are needed that eliminates the need for a separate centralized hardware circuit for each module to control the number of bus clock cycles required for a transaction over the bus.

SUMMARY OF THE INVENTION

A cooperative communication bus structure and method of operation of a cooperative communication bus structure, within an integrated circuit interfacing multiple I/O buses, are utilized to eliminate the prior art method of designing and building a centralized hardware circuit to control the number of bus clock cycles required for data transfers between particular modules. A novel internal communication bus includes a new plurality of control lines that permit each of a plurality of bus masters to control different transactions on the internal communication bus.

In addition, either a source module, a destination module, or both modules, which are used in a data transfer, signal over the internal communication bus to the bus master when additional time is needed to participate in the data transfer.

If either the source module, destination module or both modules require more time, the bus master, in response to the active stretch bus access signal or signals from the module or modules, automatically extends the bus access cycle until all modules requiring additional time signal over the internal communication bus that they are ready to proceed with the data transfer. Moreover, within a module, the lengthening of the bus access cycle may be limited to only those addresses that need more time. Consequently, the source module, destination module, or both modules can re-time a bus access cycle to accommodate the characteristics of that particular module.

This invention eliminates the need for a separate hardware circuit that implements bus delays for transfers between each set of hardware modules. In addition, this invention simplifies the design and enhances the time to market, because the designer of the source module and/or destination module includes logic within the module, as described more completely below, to determine when the module is ready to initiate the data transfer. Consequently, the designer of the bus master circuit and other circuits within the integrated circuit does not have to make any allowances for the performance characteristics for each module that the bus master circuit and other circuits communicate with over the internal communication bus.

Hence, in an integrated circuit having a plurality of modules coupled to each other by an internal communication bus having a control bus, a method of this invention includes:

driving an active signal on a bus access cycle stretch line in the control bus by a module, in the plurality of modules, having a storage location addressed by a bus master during a bus access cycle; and holding, after the active signal on the bus stretch line, a state of a signal on a data write enable line in the control bus by the bus master until the active signal on the bus access cycle stretch line is driven inactive by the module wherein the active signal on the bus access cycle stretch line causes the bus master to change a duration of the bus access cycle.

The module can be either a source module, or a destination module, and the state of the signal on the data write enable line is an inactive state in a first embodiment. In another embodiment, the state of the signal on the data write enable line is active.

When the addressed storage location comprises a single point address type memory, the module drives an active signal on an address increment disable line in the control bus. In response to the active signal on the address increment disable line, the bus master inhibits changing the address. The module also drives an active signal on an expansion address off boundary line in the control bus when an internal expansion address of the module is not aligned such that the full width of a data bus of the internal communication bus cannot be used in a data transfer, i.e., the internal expansion address is not aligned with a natural boundary of the data bus.

Thus, the method of this invention re-times an internal communication bus access cycle having a first period by generating an active bus re-time signal by a module used in the internal communication bus access cycle, and by changing the bus access cycle to a second period different from the first period by a module controlling the bus access cycle in response to the active bus re-time signal.

BRIEF DESCRIPTION OF THE DRAWINGS

FIGS. 5A to 5E are timing diagrams illustrating various examples of how a source module and a destination module re-time a bus access cycle according to the principles of this invention.

In the following description, elements with the same reference numeral are the same or equivalent elements.

DETAILED DESCRIPTION OF THE INVENTION

Figure 1:
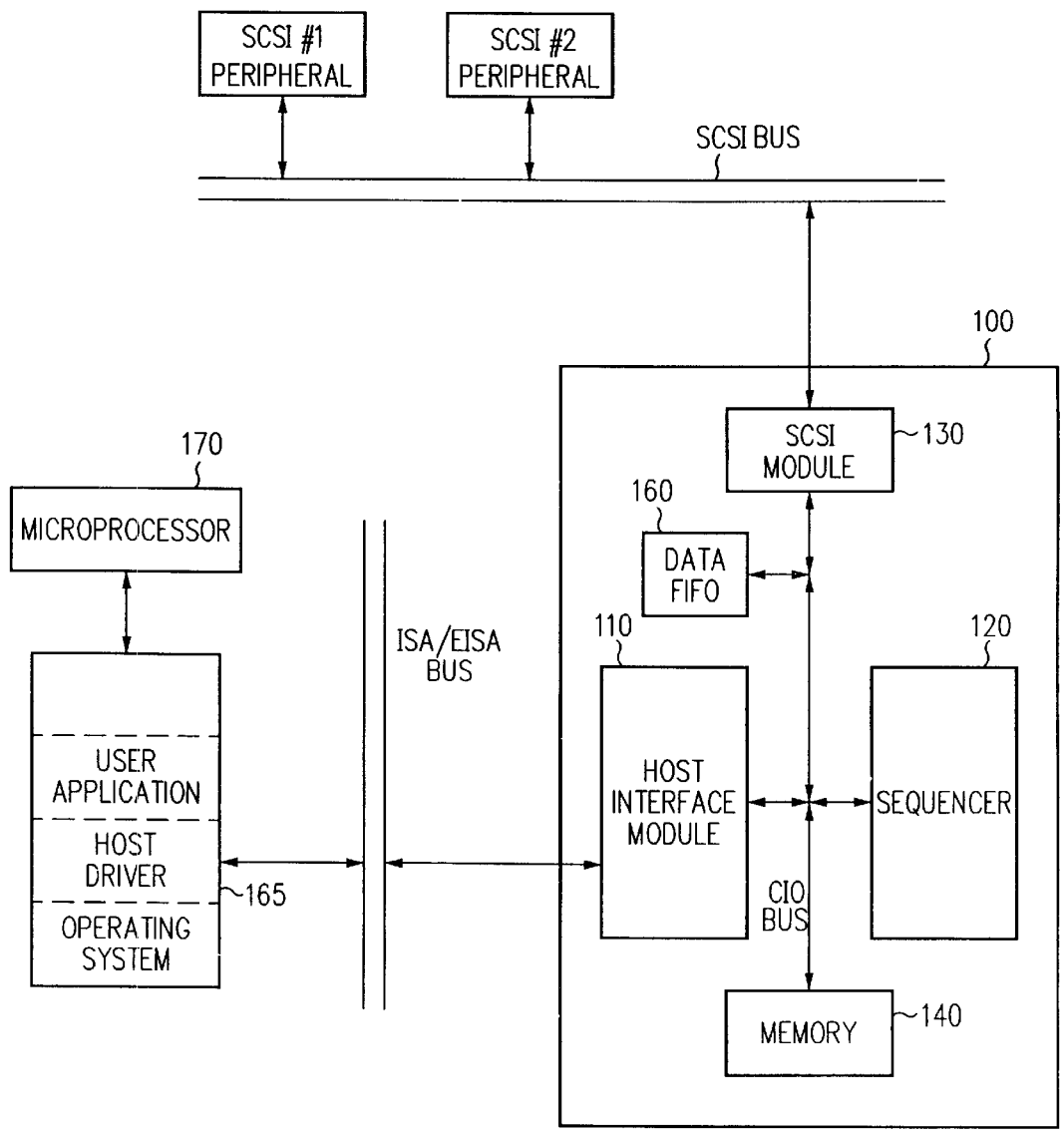
FIG. 1 is a block diagram of a prior art host adapter integrated circuit that includes an internal chip I/O bus CIOBUS.

According to the principles of this invention, a novel cooperative communication bus structure and method of operation of a cooperative communication bus structure within a multiple I/O bus interface integrated circuit are utilized to eliminate the prior art method of designing and building a separate centralized hardware circuit for each module to control the number of bus clock cycles required for data transfers between particular modules. In this invention, a novel cooperative communication bus CCB in a host adapter integrated circuit 200 includes all the functionality of the prior art chip I/O bus CIOBUS, and in addition includes a new plurality of control lines that permit each of a plurality of bus masters on cooperative communication bus CCB to control different transactions on cooperative communication bus CCB.

In addition, either the source, the destination, or both, in a data transfer, signal over cooperative communication bus CCB to the bus master when additional time is needed to participate in the data transfer. As used herein, source refers to a module within the integrated circuit that includes the addressed source storage location. Similarly, destination refers to a module within the integrated circuit that includes the addressed destination storage location.

If either the source module, destination module or both modules require more time, the bus master, in response to the active stretch bus access signal or signals from the module or modules, automatically extends the bus access cycle until all modules, that require additional time, signal over cooperative communication bus CCB that they are ready to proceed with the data transfer. Consequently, the source module, destination module, or both modules can re-time a bus access cycle to accommodate the characteristics of that particular module.

This invention eliminates the need for a separate centralized hardware circuit that implements bus delays for transfers between each set of hardware modules. In addition, this invention simplifies the design and enhances the time to market, because the designer of the source module and/or destination module includes logic within the module, as described more completely below, to determine when the module is ready to initiate the data transfer. Consequently, the designer of the bus master circuit and other circuits within the host adapter do not have to make any allowances for the performance characteristics for each module that the bus master circuit and other circuits communicate with over cooperative communication bus CCB, or for the possibility that within a hardware block, the time required in a data transfer may vary between storage locations with different addresses.

As explained more completely below, cooperative communication bus CCB provides multiple degrees of design freedom. The bus functionality enables the design of each hardware functional block in host adapter 200, the controlling firmware, and high-level software to proceed in parallel. The hardware communication source and destination locations in host adapter 200, both intra-block and inter-block, do not need to be aware of each other's timing requirements to communicate with each other. Similarly, the programmer that writes the firmware and high-level software that controls a block's functions does not need to be aware of the timing requirements for intra-block communication or inter-block communication.

According to the principles of this invention, each hardware functional block may contain multiple internal source and destination modules that are accessed for communicating status and control information associated with host adapter 200. Each of 35 these internal source and destination modules may have different requirements for communications over cooperative communication bus CCB. In addition, a module in one hardware functional block can be either a source or a destination, and another module in another hardware functional block can be either a destination or a source respectively. Herein, source refers to a source of data, and a destination refers to the location where the data from the source is being transferred.

Figure 2:
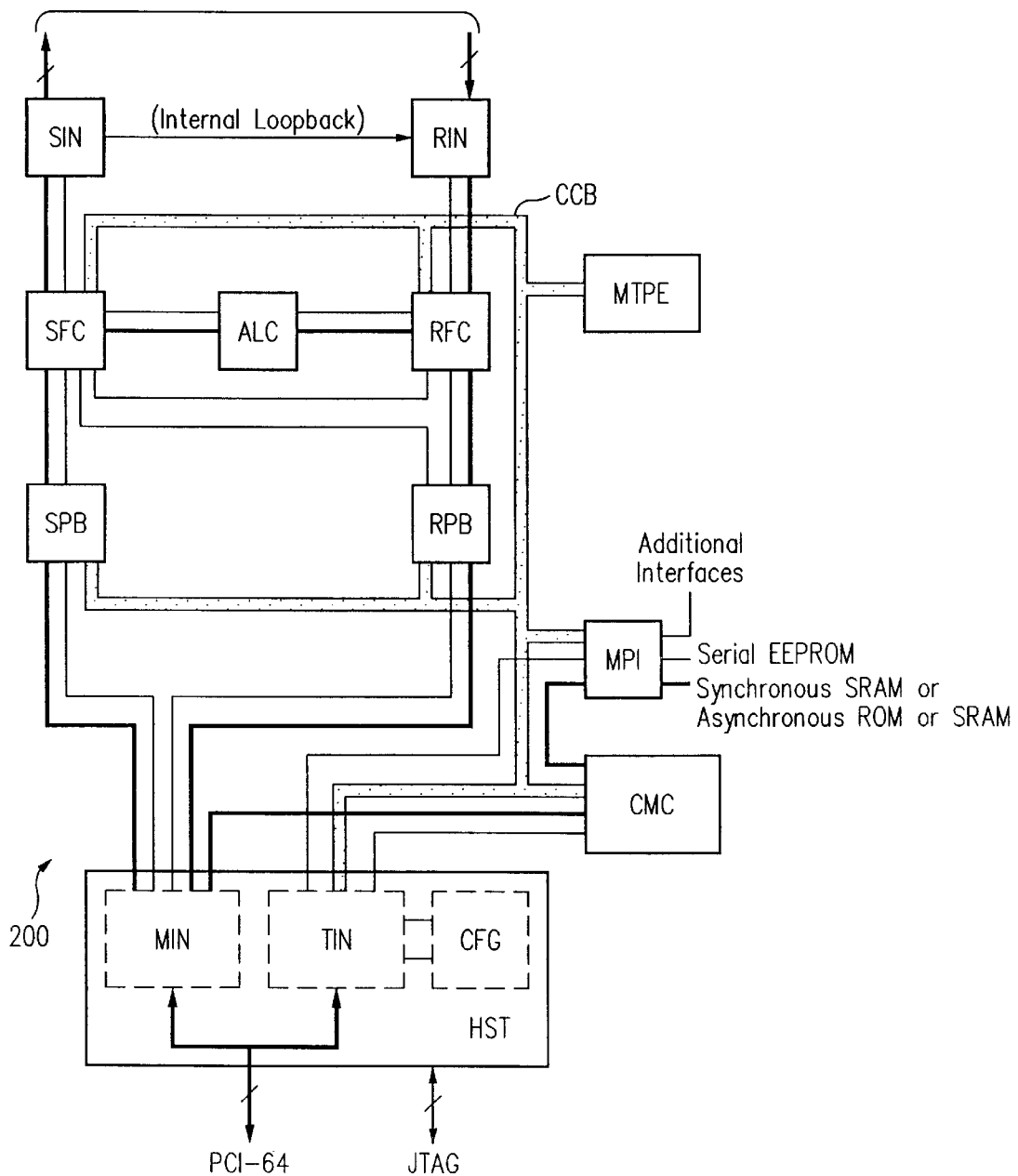
FIG. 2 is a block diagram of a multi-tasking host adapter that includes the cooperative communication bus of this invention.

In the embodiment of FIG. 2, cooperative communication bus CCB provides communication data paths between all internal modules that require firmware and software support. Specifically, cooperative communication bus CCB interconnects a send frame control block SFC, a receive frame control block RFC, a send payload buffer SPB, a receive payload buffer RPB, a multitasking protocol engine MTPE, a memory port interface block MPI, a command management channel block CMC, and a transfer in module TIN in a host interface block HST.

In this embodiment, multitasking protocol engine MTPE, command management channel block CMC, and host interface module block HST can function as bus masters of cooperative communication bus CCB. Command management channel block CMC and host interface module block HST each contain DMA engines. Multitasking protocol engine MTPE includes a RISC processor, sometimes referred to as a sequencer, that executes firmware to control the multi-tasking of host adapter 200 by executing commands in I/O hardware command blocks transferred to host adapter 200 by a driver in a host computer (not shown).

Host adapter 200 also includes a send interface block SIN that interconnects the fibre channel send parallel to series converter and send frame control block SFC; a receive interface block RIN that interconnects the fibre channel receive series to parallel converter and receive frame control block RFC; and an arbitration loop control block ALC interconnected between send and receive frame control blocks SFC and RFC. The actual functionality of each of the various blocks in host adapter 200 is not essential to this invention and so the different blocks are presented only to demonstrate an example of a host adapter integrated circuit that effectively utilizes the structure and method of operation of cooperative communication bus CCB of this invention. Of course, the cooperative communication bus CCB and the methods of operation of the bus can be utilized in any ASIC that includes an internal bus that interconnects a plurality of modules. In particular, the bus of this invention is advantageous in target devices as well as host adapter devices.

As in the prior art, a driver in a host computer can pause multi-tasking protocol engine MTPE and read or write command block transfer instructions for command management channel block CMC. In one embodiment, for more effective performance, the DMA engine in command management channel block CMC is used to transfer information over the 64-bit PCI bus between a memory in the host computer and command memory of command management channel block CMC. The modules within host interface block HST receive initialization and configuration information from multitasking protocol engine MTPE; transfer data from the PCI bus to send payload buffer SPB; and transfer data from receive payload buffer RPB to the PCI bus.

Multitasking protocol engine MTPE configures command management channel block CMC over cooperative communication bus CCB to enable DMA transfers of transfer control blocks (TCBs) over the PCI bus to a TCB array, to enable DMA transfers of Scatter/Gather list elements from host computer memory over the PCI bus to a TCB queue, and DMA transfers of pointers to completed TCBs onto a done queue in the host computer memory.

Receive interface block RIN and receive frame control block RFC handle all incoming frames from the fibre channel. Receive frame control block RFC passes frame payloads to receive payload buffer RFC. Initially, multitasking protocol engine MTPE configures receive frame control block RFC to enable block RFC to commence operation, and monitors the status of receive frame control block RFC over cooperative communication bus CCB.

Send interface block SIN and send frame control block SFC handle transfer of all outgoing frames to the fibre channel. Send frame control block SFC retrieves data from send payload buffer SPB and creates payloads. Send frame control block SFC attaches headers to the payloads and send interface block SIN drives the payloads onto the fibre channel 192. Initially, multitasking protocol engine MTPE configures send frame control block SFC to enable block SFC to commence operation, and monitors the status of send frame control block SFC over cooperative communication bus CCB.

Each of blocks MTPE, SFC, RFC, HST, and CMC operates independently from each of the other blocks. At given point in time, each of blocks SFC, RFC, HST, and CMC can be executing a different task. The task executed by a block is specified by a TCB.

Figure 3A:
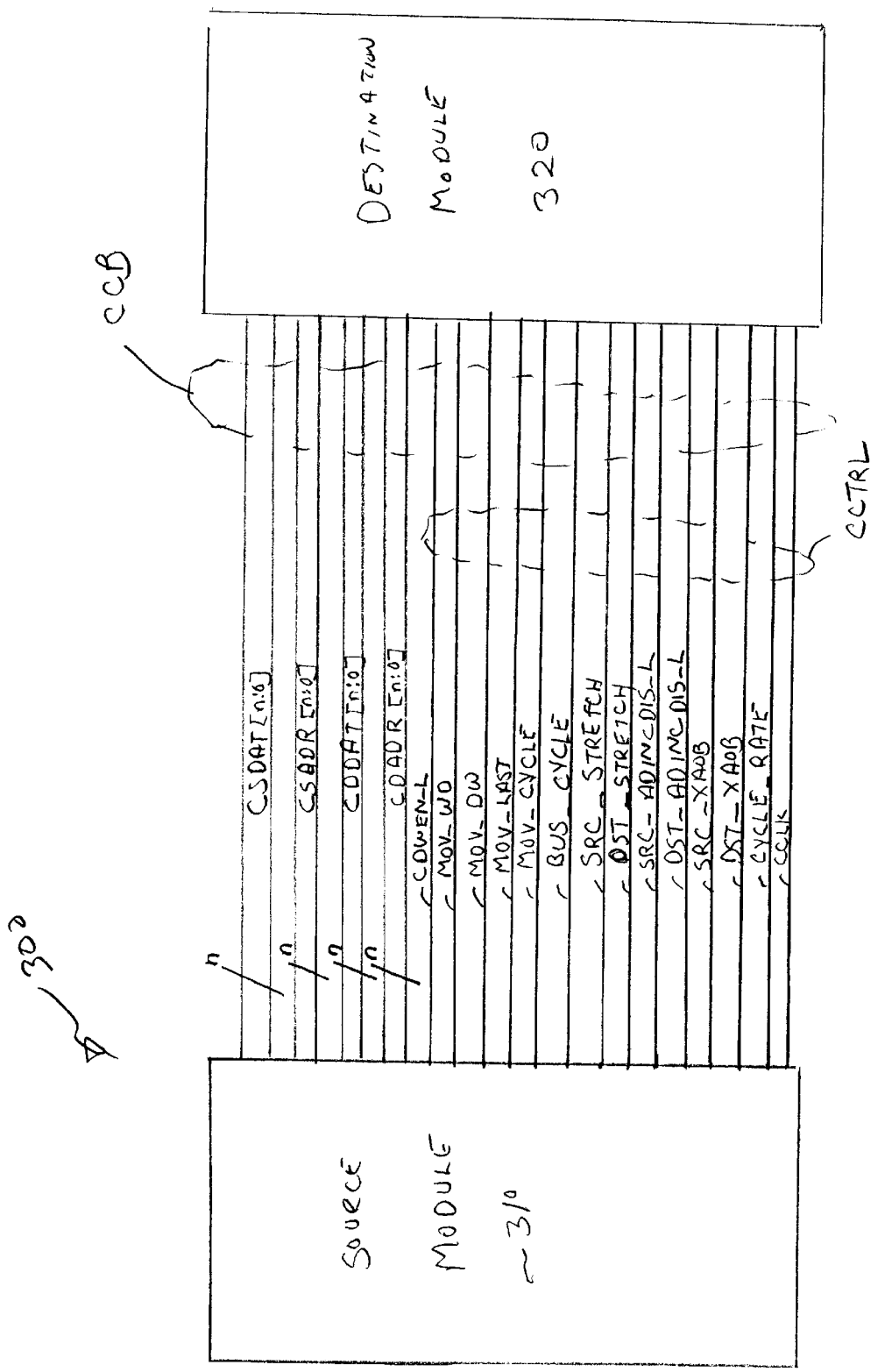
FIG. 3A is a general block diagram of two modules in the multi-tasking host adapter of FIG. 2 showing the lines of cooperative communication bus that couple the two modules.

FIG. 3A is a block diagram of a portion 300 of host adapter 200 that includes any two modules interconnected by cooperative communication bus CCB in host adapter 200. For convenience, one module is identified as source module 310 and the other as destination module 320. In addition, the block that includes source module 310 is also assumed to include a bus master that controls cooperative communication bus CCB for the duration of the data transfer between source module 310 and destination module 320. As described above, the bus master can include either an on-chip processor, or a DMA engine, for example.

Those of skill in the art will appreciate that FIG. 3A is only one example of a possible data transfer path. FIGS. 3B to 3E are examples of other possible data transfer paths using bus CCB.

Figure 3B:
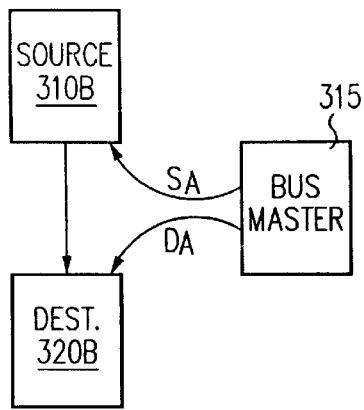
FIGS. 3B to 3E are block diagrams that illustrate different data transfer configurations that are supported by the cooperative communication bus of this invention.

In FIG. 3B, bus master 315 provides an address SA to source module 310B on bus CSADR and an address DA to destination module 320B on bus CDADR. The data transfer is directly between modules 310B and 320B using the data buses in bus CCB.

Figure 3C:
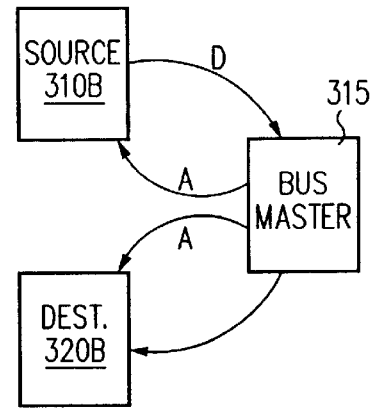

In FIG. 3C, bus master 315 provides an address SA to source module 310B on bus CSADR and an address DA to destination module 320B on bus CDADR. The data transfer is from source module 320A, to bus master 315, to destination module 320B using the data buses of bus CCB.

Figure 3D:
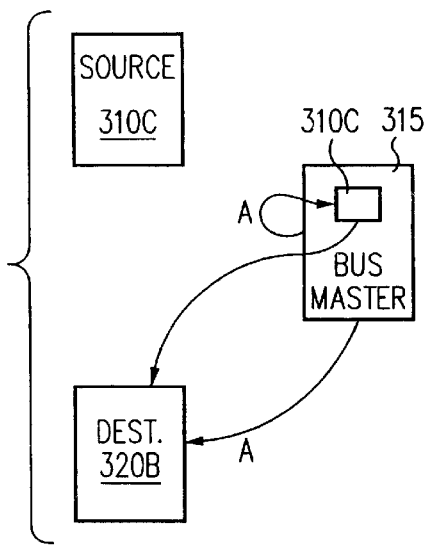

In FIG. 3D, bus master 315 provides an address SA to source module 310C within bus master 315b on bus CSADR and an address DA to destination module 320B on bus CDADR. The data transfer is directly between modules 310C and 320B using the data buses of bus CCB. module 310D, which represents any other module in host adapter 200, is not utilized in this data transfer.

Figure 3E:
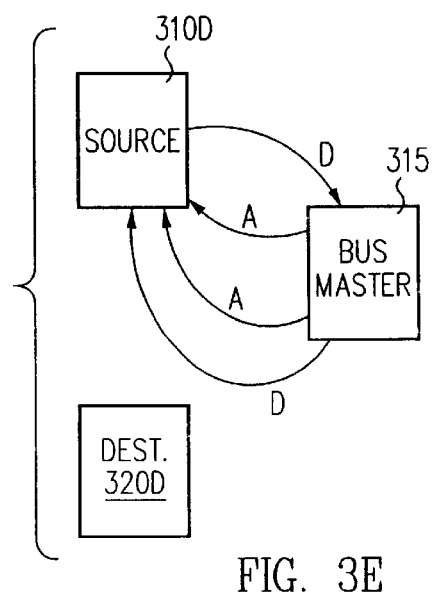

In FIG. 3E, bus master 315 provides an address SA to module 320D on bus CSADR and an address DA to module 320D on bus CDADR. The data transfer is from the source in module 320D to bus master 315 and back to the destination in module 320D using the buses in bus CCB. Notice that the separate source and destination buses in bus CCB facilitates this type of transfer in a minimum number of bus clock cycles. An example of this type of transfer is a read, modify, write transaction. Module 310E, which represents any other module in host adapter 200, is not utilized in this data transfer.

The particular type of data transfer, and the location of the source and destination modules on bus CCB are not essential to this invention. In view of this disclosure, bus CCB can be utilized for a wide variety of data transfers. Therefore, the configuration of FIG. 3A is used in the following description only for illustrative purposes.

In this embodiment, cooperative communication bus CCB includes: a communication source bus that in turn includes a communication source data bus CSDAT and a communication source address bus CSADR; a communication destination bus that in turn includes a communication destination data bus CDDAT, and a communication destination address bus CDADR; and a communication control bus CCTRL. One detailed embodiment of cooperative communication bus CCB is presented in Table 1 where the sub-bus symbol is the same as the reference numeral in FIG. 3A. Further, herein, the sub-bus or line reference numeral and the reference numeral for a signal on the sub-bus, or line are the same reference numeral.

TABLE 1

Definition of Cooperative Communication Bus CCB

| Sub-bus Symbol | Name |
|---|---|
| CSDAT(n:0) | Communication Source Data Bus, selectable width |
| CSADR(n:0) | Communication Source Address Bus, selectable width |
| CDDAT(n:0) | Communication Destination Data Bus, selectable width |
| CDADR(n:0) | Communication Destination Address Bus, selectable width |
| CCTRL | Communication Control Bus |
| CDWEN_L | Communication Data Write Enable Line, active low |
| MOV_WD | Move Word Line |
| MOV_DW | Move Double Word Line |
| MOV_LAST | Move Last Line |
| MOV_CYCLE | Move Cycle Line |
| BUS_CYCLE | Bus Cycle Line |
| SRC_STRETCH | Source Stretch Line |
| DST_STRETCH | Destination Stretch Line |
| SRC_ADINCDIS_L | Source Address Increment Disable Line, active low |
| DST_ADINCDIS_L | Destination Address Increment Disable Line, active low |
| SRC_XAOB | Source Expansion Address Off Boundary Line (The number of lines used depends on the data bus width. For a 16-bit data bus, one line is sufficient. For a 32-bit data bus, two lines are needed, i.e., SRC_XAOB0 and SRC_XAOB1.) |
| DST_XAOB | Destination Expansion Address Off Boundary Line (The number of lines used depends on the data bus width. For a 16-bit data bus, one line is sufficient. For a 32-bit data bus, two lines are needed, i.e., DST_XAOB0 and DST_XAOB1.) |
| CYCLE_RATE | Cycle Rate Line |
| CCLK | Cooperative Communication Bus Clock Line |

To understand the operation of cooperative communication bus CCB, each of the various signals on bus CCB and their interrelationship are described, and then some specific examples of the use of bus CCB are presented. In this embodiment, the communication source data bus is a sixteen-bit communication source data bus CSDAT[15:0]. Communication source data bus CSDAT[15:0] is divided into a low-byte communication source data bus CSDATL[7:0] and a high-byte communication source data bus CSDATH[15:8].

Both buses CSDATH[15:8] and CSDATL[7:0] are three-state driven buses with bus hold-cells that are pre-charged to a logic one level when a power-on-reset signal POR is active. In one embodiment, an address has been assigned to allow the reading of the state of low-byte communication source data bus CSDATL[7:0] held by the bus-hold cells, and another address has been assigned to allow the reading of the state of the high-byte communication source data bus CSDATH[15:8] held by the bus-hold cells.

In another embodiment, an internal communication source data bus of a block is connected to a first 16 terminal input of a two-to-one multiplexer. The second 16 terminal input of the multiplexer is connected to a reference voltage. The 16 terminal output of the multiplexer drives bus CSDAT[15:0]. A signal on an internal communication source data bus enable line is used to connect one of the sets of input terminals to the set of output terminals. As the feature size becomes smaller, the multiplexer is typically utilized.

The communication source address bus for communication source data bus CSDAT[15:0] is communication source address bus CSADR[8:0]-. (Herein, either a minus sign, or a "_L" at the end of a reference numeral indicates that a signal on the bus or line is active low. Further, reference numerals that are identical except for ending in either a minus sign or "_L" are the same reference numeral.)

A new address is presented on communication source address bus CSADR[8:0]- in reference to a first rising clock edge on cooperative communication bus clock line CCLK, sometimes referred to as bus clock line CCLK that commences the first clock period of a bus access cycle on cooperative communication bus CCB. In one embodiment, communication source address bus CSADR[8:0]- is a three-state driven bus with bus hold-cells that are precharged to a logic one level when a power-on-reset signal POR is active.

In another embodiment, an internal communication source address bus of a block is connected to a first nine terminal input of a two-to-one multiplexer. The second nine terminal input of the multiplexer is connected to a reference voltage. The nine terminal output of the multiplexer drives bus CSADR[8:0] _L. A signal on an internal communication source address bus enable line is used to connect one of the sets of input terminals to the set of output terminals.

Communication destination data bus, in this embodiment, is a sixteen-bit communication destination data bus CDDAT[15:0]. Communication destination data bus CDDAT[15:0] is divided into a low-byte communication destination data bus CDDATL[7:0] and a high-byte communication destination data bus CDDATH[15:8]. Both destination data buses CDDATH[15:8] and CDDATL[7:0] are constantly driven buses with no bus-hold cells.

The communication destination address bus for communication destination data bus CDDAT[15:0] is communication destination address bus CDADR[8:0]-. In one embodiment, communication destination address bus CDADR[8:0]- is a three-state driven bus with bus hold-cells that are precharged to a logic one level when the power-on-reset signal POR is active.

In another embodiment, an internal communication destination address bus of a block is connected to a first nine terminal input of a two-to-one multiplexer. The second nine terminal input of the multiplexer is connected to a reference voltage. The nine terminal output of the multiplexer drives bus CDADR[8:0] _L. A signal on an internal communication destination address bus enable line is used to connect one of the sets of input terminals to the set of output terminals.

A new address is presented on communication destination address bus CDADR[8:0]- in reference to the first rising clock edge on bus clock line CCLK that commences the first clock period of a bus access cycle on cooperative communication bus CCB. For multiple data phases in a bus access cycle, the address changes on communication destination address bus CDADR[8:0]-with the rising edge of the clock signal on bus clock line CCLK that causes the write enable signal on communication data write enable line CDWEN- to become inactive.

Bus clock line CCLK carries a clock signal that is a buffered 53.125 MHz clock that, in turn, is derived from the chip clock input pin. All activity on cooperative communication bus CCB is synchronized to the clock signal on bus clock line CCLK. In one embodiment, each module that uses this clock signal within that module controls the skew of the clock signal.

Communication data write enable line CDWEN_L carries a write enable signal that is active low for each data phase of an access to indicate when to store the data on communication destination data bus CDDAT[15:0]. Communication data write enable line CDWEN_L is a three-state driven line with a bus hold-cell that is precharged to a logic one level when the power-on-reset signal POR is active. In another embodiment, communication data write enable line CDWEN_L is driven using a logic gate or a combination of logic gates to achieve the same functionality as was described.

In general, those of skill in the art will appreciate that as the feature size becomes smaller, three-state buffers are typically not used. For each line or bus that is described herein as three-state driven, the line or bus may be implemented in an alternative way that is compatible with the feature size used to implement the device using this invention. For example, an AND gate with a signal input line, a signal enable input line, and an output line with a signal that drives a line in the bus of this invention could be used. The particular technique is used to drive the various lines and buses, is implementation dependent and is not essential to this invention.

The state of the signal on communication data write enable line CDWEN_L is correlated to the states of signals on source stretch line SRC_STRETCH, and destination stretch line DST_STRETCH. Specifically, when an active signal on either or both of source stretch line SRC_STRETCH and destination stretch line DST_STRETCH is sensed by the bus master while the signal on communication data write enable line CDWEN_L is inactive, the bus master delays generating an active signal on communication data write enable line CDWEN_L until an inactive signal is on both source stretch line SRC_STRETCH and destination stretch line DST_STRETCH. When an active signal on either or both of source stretch line SRC_STRETCH and destination stretch line DST_STRETCH is not sensed by the bus master until after the signal on communication data write enable line CDWEN_L is driven active, the bus master delays generating an inactive signal on communication data write enable line CDWEN_L until an inactive signal is on both source stretch line SRC_STRETCH and destination stretch line DST_STRETCH. As explained more completely below, this action re-times the current bus cycle.

A data store is enabled when communication write enable signal CDWEN_Lis active low and the signals on lines SRC_STRETCH and DST_STRETCH are inactive. The signal on communication data write enable line CDWEN_L must be at a logic one level, i.e., must be inactive, when bus master changes occur.

Hence, when source module 310 has decoded an address for a storage location in module 310, and requires stretching a bus access cycle on cooperative communication bus CCB for internal synchronization, or requires additional time to perform the access, source module 310 drives the signal on source stretch line SRC_STRETCH active. The signal on source stretch line SRC_STRETCH is a tri-state driven signal with a bus hold-cell that is precharged to a logic one level when the power-on-reset signal is active. In general, source module 310 drives source stretch line SRC_STRETCH active whenever additional time is needed to provide valid data for the current data transfer of the cooperative communication bus access cycle. Source module 310 also monitors the state of the signal on destination stretch line DST_STRETCH.

Source module 310 drives the signal on source stretch line SRC_STRETCH active with the same clock edge with which source module 310 claims the access to cooperative communication bus CCB. For three bus clock cycle data transfers, the active signal on source stretch line SRC_STRETCH delays the active edge on communication data write enable line CDWEN_L. For two bus clock cycle data transfers, the active signal on source stretch line SRC_STRETCH delays the inactive edge on communication data write enable line CDWEN_L. When the signal on source stretch line SRC_STRETCH is active, the bus master access is stretched, i.e., extended by increments of clock cycles on bus clock line CCLK.

In this embodiment, the sequencer in MTPE can perform either two or three bus clock cycle data transfers. The number of bus clock cycles used for a data transfer is programmable. However, the type of instruction being executed by multitasking protocol engine MTPE is monitored by hardware within the sequencer. When an additional bus clock cycle is needed to execute the instruction, irrespective of the number programmed, e.g., when a zero flag, or a carry flag must be detected, the data transfer is changed to three bus clock cycles to provide reliable execution of the instruction. In one embodiment, hardware in the sequencer senses the instruction being executed and when an instruction is sensed that requires the third bus clock cycle, the hardware generates an internal wait state that stretches the bus cycle from two bus clock periods to three bus clock periods. Hence, in this embodiment, the sequencer supports bus cycles having a plurality of periods.

When destination module 320 has decoded an address of a storage location in module 320, and requires stretching the bus access cycle on cooperative communication bus CCB for internal synchronization, or requires gaining additional time to prepare for the access, destination module 320 drives the signal on destination stretch line DST_STRETCH active. The signal on destination stretch line DST_STRETCH is a tri-state driven signal with a bus hold-cell that is precharged to a logic one level when the power-on-reset signal is active.

Hence, destination module 320 drives an active signal on destination stretch line DST_STRETCH when additional time is needed to prepare for storing the current transfer of data of the cooperative communication bus cycle. Destination module 320 drives the signal on destination stretch line DST_STRETCH active with the same clock edge with which destination module 320 claims the access to cooperative communication bus CCB. For three bus clock cycle data transfers, the active signal on destination stretch line DST_STRETCH delays the active edge on communication data write enable line CDWEN_L. For two bus clock cycle data transfers, the active signal on destination stretch line DST_STRETCH delays the inactive edge on communication data write enable line CDWEN_L. When the signal on destination stretch line DST_STRETCH is active the bus master access is stretched, i.e., extended by increments of clock cycles on bus clock line CCLK.

The signal on move cycle line MOV_CYCLE is driven active to switch the cooperative communication bus data transfer logic from an ALU data transfer mode to a move data transfer mode. In this embodiment, multitasking protocol engine MTPE includes an ALU and the ALU data transfer is a data transfer from a source to the ALU and from the ALU to a destination. The ALU data transfer mode uses either two or three bus clock cycles, as explained above. A move data transfer is a data transfer directly from a source to a destination without going through the ALU. The move data transfer mode can require either two or three clock cycles.

Multitasking protocol engine MTPE drives the signal on move cycle line MOV_CYCLE active when (i) multitasking protocol engine MTPE decodes an opcode MOV in a command line for the engine, and (ii) multitasking protocol engine MTPE is the current bus master of cooperative communication bus CCB. Multitasking protocol engine MTPE only moves data from the addressed source to an addressed destination (the source and destination addresses are typically supplied in the command line) and no data passes through the ALU in multitasking protocol engine MTPE.

In this embodiment, if another bus master in host adapter 200 wants to utilize cooperative communication bus CCB, the bus master sends an active pause request signal PAUSEREQ to multitasking protocol engine MTPE. In one embodiment, signal PAUSEREQ is actually two input signals to multitasking protocol engine MTPE, a pause signal PAUSE and a top-of-idle loop pause signal TILPAUSE. In this embodiment, when multitasking protocol engine MTPE is executing a task, multitasking protocol engine MTPE transfers processing to an idle loop whenever there is going to be a significant delay in performing the task. The idle loop is a string of instructions that tests for and/or controls testing for completion of events to be performed. Multitasking protocol engine MTPE either waits for an event in the idle loop, or responds to an event from the idle loop. Hence, when multitasking protocol engine MTPE is in the idle loop and an event occurs, multitasking protocol engine MTPE takes appropriate action to handle the event by executing an appropriate routine, or resuming execution of a suspended routine. Similarly, when multitasking protocol engine MTPE has completed a task, engine MTPE transfers to the idle loop.

When top-of-idle loop pause signal TILPAUSE is driven active, multitasking protocol engine MTPE releases bus CCB upon reaching the top of the idle loop. When signal PAUSE is driven active, multitasking protocol engine MTPE releases bus CCB at the earliest completion of a multitasking protocol engine instruction.

Thus, in general an active pause request signal PAUSEREQ requests multitasking protocol engine MTPE to release bus CCB at the end of the next appropriate multitasking protocol engine instruction completion. Signal PAUSEREQ is a constantly drive signal with no bus-hold cells. When multitasking protocol engine MTPE releases bus CCB in response to the active pause request signal PAUSEREQ, engine MTPE drives a pause acknowledge signal PAUSEACK active. Signal PAUSEACK also is a constantly driven signal with no bus-hold cells.

The signal on move cycle line MOV_CYCLE is also driven active whenever pause acknowledge signal PAUSEACK is active to switch cooperative communication bus logic from the ALU transfer mode to the move data transfer mode for host interface block HST or command management channel block CMC data transfers. In these cases, data is moved from either host interface block HST, or command management channel block CMC to the addressed destination, or alternatively moved from the addressed source to either host interface module block HST or command management channel block CMC. The signal on move cycle line MOV_CYCLE is a constantly driven signal with no bus-hold cells.

Figure 4:
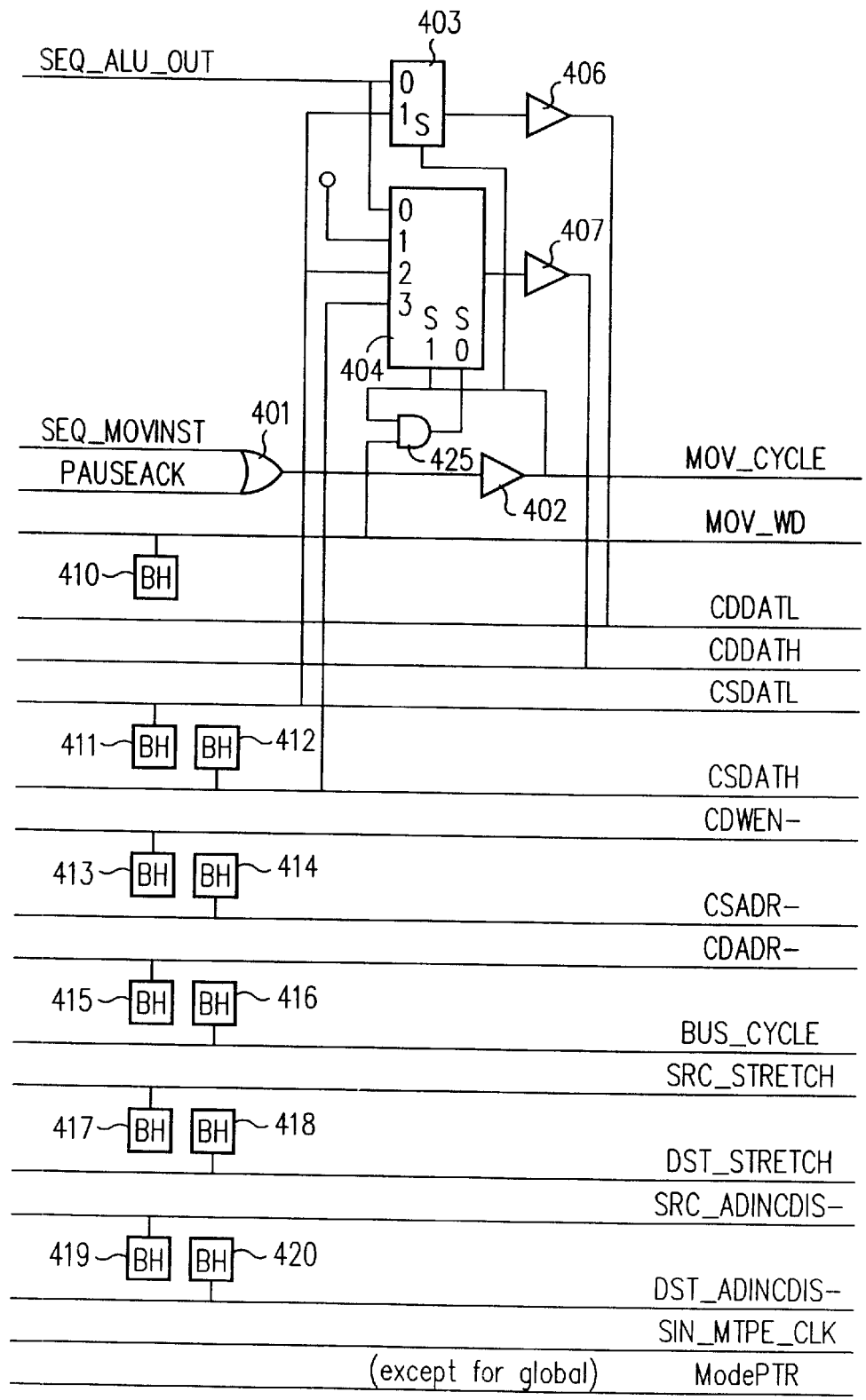
FIG. 4 is a schematic diagram of one embodiment of a circuit used to switch cooperative communication bus from an ALU data transfer mode to a move data transfer mode, according to the principles of this invention.

FIG. 4 is a schematic diagram of a portion of cooperative communication bus CCB and data transfer logic for shifting between an ALU data transfer mode and a move data transfer mode. The reference numerals on the bus lines are defined in Table 1 above. Signal PAUSEACK, that drives a first input terminal of OR gate 401, was described above. Sequencer move instruction signal SEQ_MOVINST, that drives a second input terminal of OR gate 401, is a signal internal to multitasking protocol engine MTPE. The sequencer move instruction signal SEQ_MOVINST is driven true when multitasking protocol engine MTPE has decoded the opcode MOV. This signal is constantly driven without a bus-hold cell.

The output signal from OR gate 401 drives a buffer 402 that in turn drives a signal on move cycle line MOV_CYCLE. Hence, when either sequencer move instruction signal SEQ_MOVINST or signal PAUSEACK is active, the signal on move cycle line MOV_CYCLE is driven active. The data on sequencer output bus SEQ_ALU_OUT drives a first input of two-to-one multiplexer 403. The data on low-byte communication source data bus CSDATL drives a second input terminal of multiplexer 403. The signal on move cycle line MOV_CYCLE drives select terminal S of multiplexer 403. An output terminal of multiplexer 403 drives buffer 406, which in turn drives low-byte communication destination data bus CDDATL.

Hence, when the signal on move cycle line MOV_CYCLE is inactive, the data on sequencer output bus SEQ_ALU_OUT from the sequencer in multitasking protocol engine MTPE is driven on low-byte communication destination data bus CDDATL. When the signal on move cycle line MOV_CYCLE is active, the data from low-byte communication source data bus CSDATL is driven on low-byte communication destination data bus CDDATL.

The data on sequencer ALU output bus SEQ_ALU_OUT also drives a first input terminal of a four-to-one multiplexer 404. The second input terminal of multiplexer 404 is connected to a power supply voltage. A third input terminal of multiplexer 404 is connected to the low-byte communication source data bus CSDATL.

A fourth input terminal of multiplexer 404 is connected to the high-byte of communication source data bus CSDATH. An output terminal of multiplexer 404 drives a buffer 407 that in turn drives high-byte communication data bus CDDATH.

The signal on move word line MOV_WD drives a first input terminal of AND gate 405. The move word line MOV_WD is described more completely below. The signal on move cycle line MOV_CYCLE drives a second select terminal S1 of multiplexer 404 and a second input terminal of AND gate 405. The output terminal of AND gate 405 is connected to a first select terminal S0 of multiplexer 404. Table 2 illustrates the data driven on communication destination data buses CDDATL and CDDATH for various combinations of states of signals MOV_CYCLE, MOV_WORD, S, S1, and S0 for the configuration illustrated in FIG. 4. The circuit in FIG. 4 is only illustrative of one embodiment of the invention. The functionality demonstrated in Table 2 could be implemented in a wide variety of ways.

TABLE 2

DEMONSTRATION OF SWITCHING SOURCE FOR VARIOUS COMBINATIONS of MOV_CYCLE and MOV_WORD

| MOV_CYCLE | MOV_WORD | S | S1 | S0 | CDDATL | CDDATH |
|---|---|---|---|---|---|---|
| 0 | 0 | 0 | 0 | 0 | SEQ_ALU_OUT | SEQ_ALU_OUT |
| 1 | 0 | 1 | 1 | 0 | CSDATL | CSDATL |
| 1 | 1 | 1 | 1 | 1 | CSDATL | CSDATH |

Notice that the sequencer ALU output can be stored using either the high byte or the low byte of communication destination data bus CDDAT. Similarly, data from an eight-bit source can be stored using either the high byte or the low byte of communication destination data bus CDDAT. In FIG. 4, BH cells 410 to 420 are bus-hold cells.

With this understanding of the basis for various signal states on move cycle line MOV_CYCLE and the resulting switching between data from the sequencer and data on communication source data bus based upon the state of signal MOV_CYCLE, several examples of various signal states on source stretch line SRC_STRETCH, and destination stretch line DST_STRETCH are presented in FIGS. 5A to 5E. The stretch signals as illustrated in these Figures can be utilized to enhance data transfer across internal clock domains which may be asynchronous to each other, since no restrictions are placed upon the source or destination other than each must be on bus CCB.

In FIG. 5A, clock signal SIN_MTPE_CLK is bus clock signal CCLK. Clock signal SIN_MTPE_CLK is used for each of FIGS. 5A to 5E although the signal is shown only in FIG. 5A.

FIG. 5A is for a three-bus clock cycle data transfer. Initial clock edge 501 starts the three-clock cycle bus access cycle in this example. In response to initial clock edge 501, the bus master drives source and destination addresses on cooperative communication bus CCB and drives communication data write enable signal CDWEN_L inactive if the signal is not already inactive.

Neither source stretch signal SRC_STRETCH nor destination stretch signal DST_STRETCH is driven active by the addressed source, or the addressed destination. Consequently, the bus master does not detect a bus access cycle stretch request and takes communication data write enable signal CDWEN_L active after clock edge 503 to indicate to the addressed destination that valid data is on cooperative communication destination data bus CDDAT. On the next active clock edge 504, i.e., the clock edge that terminates the bus access cycle, the destination stores the data on bus CDDAT. Signal CDWEN_L is held active until after the start of the next bus cycle with clock edge 504 to allow the destination to do the store. Also, with clock edge 504, the addressed source stops driving bus CSDAT.

FIG. 5B also is for a three-bus clock cycle data transfer. Initial clock edge 501 starts what is normally a three-bus clock cycle bus access cycle. In response to initial clock edge 501, the bus master drives communication data write enable signal CDWEN_L inactive, and drives the source address on communication source address bus CSADR and the destination address on communication destination address bus CDADR. (See FIG. 7.) All sources and destinations decode the respective address to determine which should claim the access cycle. In this example, both the addressed source and the addressed destination require additional time and so the bus access cycle is extended beyond the normal three bus clock cycles.

To extend the bus access cycle, the source drives source stretch signal SRC_STRETCH active, and the destination drives destination stretch active DST_STRETCH in response to the second active clock edge 502 in the bus access cycle. In this example, both the source and destination require one additional bus clock cycle, and so in response to active edge 503 take their respective stretch signals inactive. Note that if only one of the source and destination required an additional clock cycle, the description would be the same except one of the two stretch signals would not be driven active.

The bus master senses the active source stretch signal SRC_STRETCH and the active destination stretch signal DST_STRETCH and holds communication data write enable signal CDWEN_L inactive until both stretch signals are inactive. On the first active clock edge 504 after both stretch signals are inactive, the bus master drives communication data write enable signal CDWEN_L active. Note that this was done without multitasking protocol. engine MTPE executing any special instructions, and without processing by any hardware circuit in the bus master to determine the delay required for the addressed source and destination. The source and destination simply drive the appropriate stretch bus access signal active which in turn causes the bus master to extend the number of bus clock cycles in the current bus access cycle as required by the source and destination.

FIG. 5C also is for a three-bus clock cycle data transfer. Again, initial clock edge 501 starts what is normally a three-bus clock cycle bus access cycle. In response to initial clock edge 501, the bus master drives communication data write enable signal CDWEN_L inactive, and drives the source address on communication source address bus CSADR and the destination address on communication destination address bus CDADR. The source and destination decode the respective addresses. Again, both the source and destination require additional time. To extend the bus cycle, the source drives source stretch signal SRC_STRETCH active, and the destination drives destination stretch active DST_STRETCH in response to second active bus clock edge 502 in the bus access cycle.

In this example, the source requires one additional bus clock cycle, while the destination requires three additional bus clock cycles. Hence, in response to active clock edge 503, the source takes source stretch signal SRC_STRETCH inactive. When source stretch signal SRC_STRETCH goes inactive, the bus master still senses the active destination stretch signal DST_STRETCH and so knows that the destination requires more time to get ready to store the data.

The bus master monitors active destination stretch signal DST_STRETCH and holds communication data write enable signal CDWEN_L inactive until both stretch bus access cycle signals are inactive. On the first active clock edge 506 after both stretch bus access cycle signals are inactive, the bus master drives communication data write enable signal CDWEN_L active. Again, note that this was done for a different destination than that in FIG. 5B without multitasking protocol engine MTPE executing any special instructions, and without processing by any centralized hardware circuit to supply the delay required for the addressed source and destination.

FIG. 5D is for a two-bus clock cycle data transfer. Initial clock edge 501 starts the normal two-clock cycle bus access cycle. In response to initial clock edge 501, the bus master drives communication data write enable signal CDWEN_L inactive if it was not already inactive. Neither source stretch signal SRC_STRETCH nor destination stretch signal DST_STRETCH is driven active by the source, or destination in this example. Consequently, the bus master does not detect a bus access cycle stretch request and takes communication data write enable signal CDWEN_Lactive after clock edge 502 to indicate to the destination that valid data is on cooperative communication destination data bus CDDAT. On the next active clock edge 503, the destination stores the data on bus CDDAT and the source stops driving data on bus CSDAT. Signal CDWEN_Lis held active by the bus master until after the start of the next bus cycle with clock edge 503 to allow the destination to do the store.

FIG. 5E also is for a two-bus clock cycle data transfer. Initial clock edge 501 starts what is normally a two-clock cycle bus cycle. In response to initial clock edge 501, the bus master drives communication data write enable signal CDWEN_L inactive, and drives the source address on communication source address bus CSADR and the destination address on communication destination address bus CDADR. All sources and destinations decode the respective addresses.

In this example, the addressed source requires additional time, and so the bus access cycle is extended beyond the normal two bus clock cycles. To extend the bus access cycle, the source drives source stretch signal SRC_STRETCH active in response to the second active clock edge 502 in the bus access cycle. In this example, the source requires one additional clock cycle, and so in response to active edge 503, takes source stretch signal SRC_STRETCH inactive.

The bus master drives an active signal on communication data write enable line CDWEN_L in response to second active clock edge 502. As described above, in a normal two bus clock cycle data transfer, the destination would store the data on communication destination data bus CDDAT on rising clock edge 503, i.e., on the first active clock edge after an active signal on communication data write enable line CDWEN_L. However, the destination monitors the signal level on source stretch line SRC_STRETCH, and detects the active signal. Therefore, the destination holds off storing the data on bus CDDAT until there is an inactive signal on source stretch line SRC_STRETCH and an active signal on communication data write enable line CDWEN_L.

The bus master monitors the signal levels on source stretch line SRC_STRETCH and destination stretch line DST_STRETCH and so detects the active source stretch signal SRC_STRETCH and holds communication data write enable signal CDWEN_Lactive, i.e., delays the inactive edge of the signal, until source stretch signal SRC_STRETCH is inactive.

When the source removes the active signal on source stretch line SRC_STRETCH, the destination senses the condition required for storing data, and so on clock edge 504 stores the data on communication destination bus CDDAT, and the source stops driving bus CSDAT. Similarly, on clock edge 504, the bus master starts a new bus access cycle, and drives an inactive signal on communication data write enable line CDWEN_L.

Hence, in summary, a bus master on cooperative communication bus starts a bus access cycle by driving a source address and a destination address on cooperative communication bus that couples the source module, destination module, and bus master. All source modules and destination modules in the integrated circuit decode the addresses. If the module containing the addressed storage location requires additional time, the module drives an active signal on a bus access cycle stretch line in a communication control bus of the communication data bus. This active signal results in re-timing of the bus access cycle.

In one embodiment, the bus master holds off driving an active signal on a data write enable line in the control bus until the active signal on the bus access cycle stretch line is driven inactive by the module. In another embodiment, the destination module senses the signals on the source bus access cycle stretch line and on the data write enable line and does not store data until there is an inactive signal on source bus access cycle stretch line and an active signal on the data write enable line.

Consequently, any source module, destination module, or bus master in the integrated circuit does not require any timing information about another module, but yet any source module or destination module can function with a bus access cycle of an arbitrary length. The elimination of separate hardware circuitry and/or processor instructions to compensate for performance variations in the various modules eliminates the road-blocks in the prior art design process. The simple functionality that is added to each source and destination module to sense and drive the bus access stretch cycle lines provides a new level in functionality as described above.

As indicated above, the widths of communication source data bus CSDAT and communication destination data bus CDDAT are variable. In one embodiment, the buses support byte, word, and double word data transfers. The signal on move word line MOV_WD is driven active by a bus master when a data word (16-bits) is to be transferred and driven inactive when a byte is to be transferred. Move word signal MOV_WD may change state during a bus cycle when the initial or final address is odd, or the data byte count is odd. This line is not used when the data moved is less than a word in width.

The signal on move double word line MOV_DW is active when a double data word (32-bits) is to be transferred and is inactive when a byte or a word is to be transferred. Move double word signal MOV_DW may change state during a bus cycle when the initial or final address is not double word aligned, or the data byte count is not four. This line is not used when either the data on bus CSDAT, or bus CDDAT is less than a double word in width.

The bus master drives an active signal on bus cycle line BUS_CYCLE to indicate that the first address of a new cooperative communication bus cycle is present. In response to this active signal, all source and destination locations must decode the address bus to that location and participate when the addressed location is within the location's address space. The end of a cooperative communication bus cycle is indicated by the bus master driving the signal on bus cycle line BUS_CYCLE inactive for the last data transfer at the same time that communication data write enable signal CDWEN_Lis driven active for the last data transfer. The signal on bus cycle line BUS_CYCLE is used to indicate the end of a bus cycle that may include multiple data transfers, as explained more completely below.

The signal on line BUS_CYCLE is a tri-state driven signal with a bus hold cell that is precharged to an inactive state, e.g., a logic zero, when power-on-reset signal POR is active. Recall as described above, the lines in the control bus in another embodiment are not driven by three-state buffers, and instead appropriate logic gates and enable signals are used.

For MTPE Opcode MOV, multitasking protocol engine MTPE does not drive bus cycle signal BUS_CYCLE inactive for each data phase. Similarly, when a series of cycles are a move data transfer mode, move cycle signal MOV_CYCLE is continuously active from the time bus cycle signal BUS_CYCLE goes active until the end of the bus access by the bus master, either multitasking protocol engine MTPE or command management channel block CMC. Bus cycle signal BUS_CYCLE, in the case where multitasking protocol engine MTPE is the bus master, is driven inactive only for the last data phase that is ending the cooperative communication bus access cycle, i.e., when the count of bytes to be moved is one and the signal on move word line MOV_WD is inactive, or the byte count is two or greater, and the signal on move word line MOV_WD is active.

For DMA transfers by command management channel block CMC, signal BUS_CYCLE also does not become inactive for each data phase. Bus cycle signal BUS_CYCLE, in this case, is driven inactive only for the last data phase that is ending the cooperative communication bus access, i.e., when the count of bytes to be moved is expired or the transfer is interrupted by a higher priority request.

If bus cycle signal BUS_CYCLE is active, and move cycle signal MOV_CYCLE is inactive, an ALU data transfer mode is active. ALU cycles only perform a single data transfer(data from the source on bus CSDATL is transferred into the ALU; some operation is performed on the data; and the resulting data output from the ALU is transferred to a destination) Note that in this embodiment, the ALU is an eight-bit ALU. However, either a 16-bit or a 12-bit ALU could be utilized in other embodiments. Also, in one embodiment, the bus master in host module HST does not perform multiple data phase accesses on cooperative communication bus CCB.

Move last signal MOV_LAST is driven active by the bus master to provide an early indication that the current move data transfer cycle is performing the last data transfer in the current bus cycle. Recall as explained above, signal MOV_CYCLE may stay active over several data transfers. Thus, an active move last signal MOV_LAST indicates the last transfer in the current data phase. For each data transfer, move last signal MOV_LAST is held active for the last data transfer address and data phases. Signal MOV LAST is used when synchronous SRAM is used that is doing data read prefetch. Signal MOV_LAST going active indicates when to stop the prefetch.

Another novel feature of cooperative communication bus CCB, in addition to the bus cycle stretch feature, is the ability of the bus to automatically handle repeated data accesses to single point address type locations, e.g., a first-in-first-out memory, and to multiple point address type locations, e.g., DRAM or SRAM. For repeated data accesses to a single point address type location, the same address is used for each transfer to, or retrieval from the memory while for a multiple point address type location, the address on bus CCB must be changed for each transfer or retrieval from the memory.

Source address increment disable line SRC_ADINCDIS_L, destination address increment disable line DST_ADINCDIS_L, source expansion address off boundary SRC_XAOB, and destination expansion address off boundary DST_XAOB lines of cooperative communication bus CCB are sensed by a bus master to determine the memory access type involved in the data transfer, and the data size that can be transferred.

When a source decodes an address on communication source address bus CSADR, and determines that the address is for a single point address type memory location, the source drives an active signal on source address increment disable line SRC_ADINCDIS_L, which in this embodiment is an active low signal. In this embodiment the signal on source address increment disable line SRC_ADINCDIS_L is a tri-state driven signal with a bus-hold cell, that is precharged to an inactive level, e.g., a logic one. When the bus master receives an active signal on source address increment disable line SRC_ADINCDIS_L, and an active signal is on move cycle line MOV_CYCLE, the bus master inhibits incrementing the address on communication source address bus CSADR. Consequently, all the data for the move cycle is transferred from the single point address location.

Similarly, when a destination decodes an address on communication destination address bus CDADR, and determines that the address is for a single point address type memory location, the destination drives an active signal on destination address increment disable line DST ADINCDIS_L, which in this embodiment is an active low signal. In this embodiment the signal on destination address increment disable line DST_ADINCDIS_L is a tri-state driven signal with a bus-hold cell, that is precharged to an inactive level, e.g., a logic one.

When the bus master receives an active signal on destination address increment disable line DST_ADINCDIS_L, and an active signal is on move cycle line MOV_CYCLE, the bus master inhibits incrementing the address on communication destination address bus CDADR. Consequently, all the data for the move cycle is transferred to the single point address location.

Figure 6A:
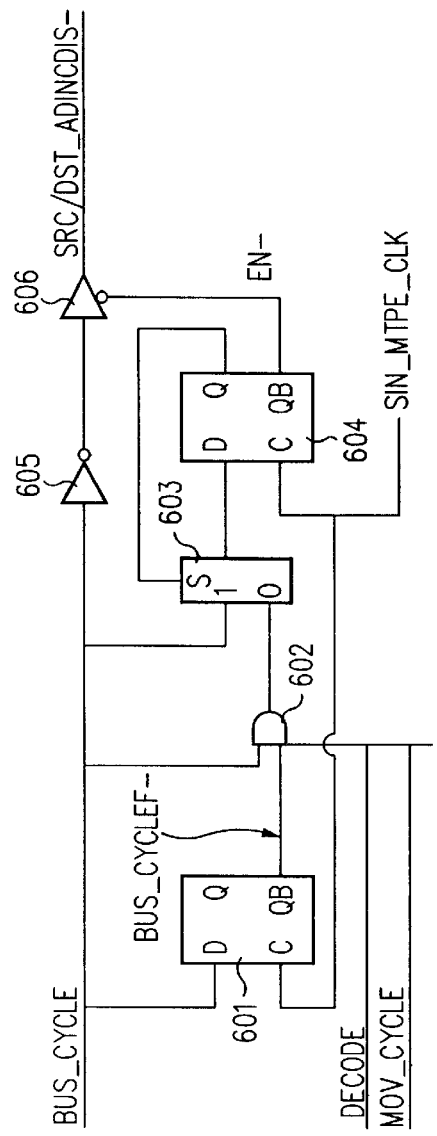
FIG. 6A is a schematic diagram of one circuit used to disable address incrementing on the cooperative communication bus when a single address memory location, e.g., a data port, is being accessed.

FIG. 6A is a schematic diagram of one circuit embodiment that is used in a source module and a destination module to drive the address increment disable line. Bus cycle line BUS CYCLE is connected to input terminal D of flip-flop 601, to a first input terminal of AND gate 602, a second input terminal of a two-to-one multiplexer 603, and to an input terminal of inverter 605. An output terminal of inverter 605 drives a tri-state buffer 606 that in turn drives source address increment disable line SRC_ADINCDIS L.

Clock line SIN_MTPE_CLK is connected to clock terminal C of flip-flop 601 and clock terminal C of flip-flop 604. Complement output terminal QB flip-flop 601 is connected to a second input terminal of AND gate 602. A third input terminal of AND gate 602 is connected to line DECODE, and a fourth input terminal of AND gate 602 is connected to move cycle line MOV_CYCLE. The signal on line DECODE is driven active when the source decodes an address for a single address memory in the source, and is held active by the source until the source senses the last data transfer and senses that on the same active clock edges communication data write enable signal CDWEN_L is active, and destination stretch signal DST_STRETCH, source stretch signal SRC_STRETCH, and bus cycle signal BUS_CYCLE are all inactive. The output line from AND gate 602 is connected a first input terminal of multiplexer 603.

The output terminal of multiplexer 603 is connected to input terminal D of flip-flop 604. Output terminal Q of flip-flop 603 is connected to select terminal S of multiplexer 603, and complement output terminal QB is connected to inverting control terminal of tri-state buffer.

Figure 6B:
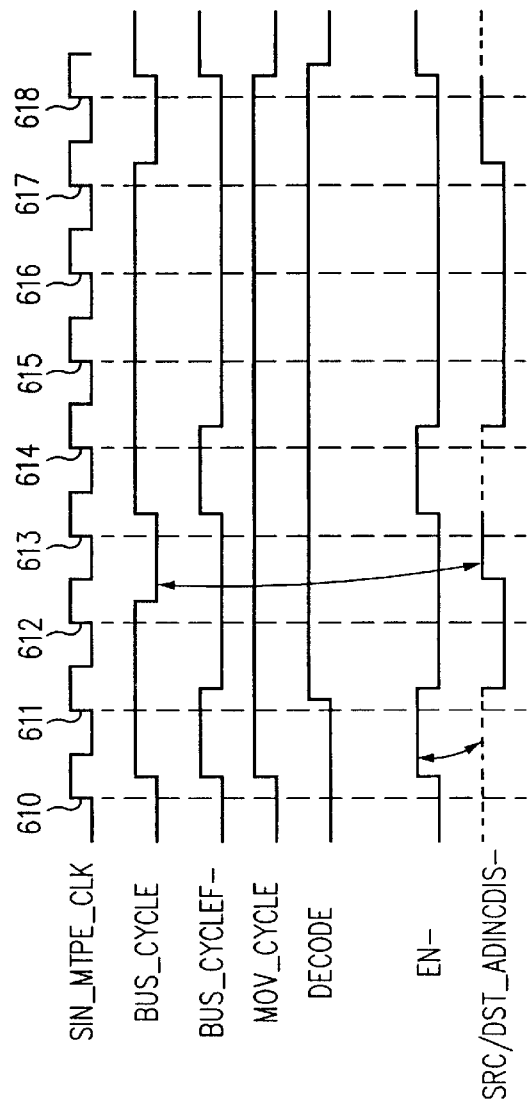
FIG. 6B is a timing diagram for the circuit of FIG. 6A.

Table 3 is data that is also shown in timing diagram of FIG. 6B. In Table 3, the numbers in the first row are reference numerals for active clock edges in FIG. 6B. A column in Table 3 with no number in the first row is used when a signal changes state after the preceding active clock edge.

bus CSDAT, if the source's internal expansion address is pointing at an odd byte, the source drives the active signal on source expansion address off boundary line SRC__XAOB and if signal MOV__WORD is active, the signal MOV__WORD is driven inactive. This feature eliminates the requirement that the programmer know the relationship between the internal expansion addresses and the natural boundary defined by the address buses CSADR and CDADR.

TABLE 3

| | T = 0 | 610 | | 611 | | 612 | | 613 | 614 | 615 |
|---|---|---|---|---|---|---|---|---|---|---|
| BUS__CYCLE | 0 | 0 | 1 | 1 | 1 | 0 | 0 | 1 | 1 | 1 |
| DECODE | 0 | 0 | 0 | 1 | 1 | 1 | 1 | 1 | 1 | 1 |
| MOV-CYCLE | 0 | 0 | 1 | 1 | 1 | 1 | 1 | 1 | 1 | 1 |
| BUS__CYCLEF-AND 602 | 0 | 1 | 0 | 0 | 0 | 0 | 1 | 1 | 0 | 0 |
| S | 1 | 0 | 1 | 1 | 1 | 1 | 0 | 0 | 1 | 1 |
| 604D | 0 | 0 | 1 | 1 | 1 | 0 | 0 | 1 | 1 | 1 |
| EN-OUTPUT | 0 | 1 | 0 | 0 | 0 | 0 | 1 | 1 | 0 | 0 |
| OUTPUT | — | — | 0 | 0 | 0 | 1 | — | — | 0 | 0 |

As shown in FIG. 6B, initially source address increment disable line SRC__ADINCDIS__L is tristated. When the source decodes the address on communication source address bus CSADR and determines that the address is for a single point address location in the source, the source drives the signal on line DECODE active as shown in FIG. 6B. The circuit shown in FIG. 6A, drives the signal on source address increment disable line SRC__ADINCDIS__L in response to the clock edge that terminates the first bus clock cycle in the bus access cycle. The signal remains active until the bus master drives an inactive signal on bus cycle line BUS$_{13}$ CYCLE.

The first rising edge in the next bus cycle tri-states source address increment disable line SRC__ADINCDIS__L until the second active edge in the next bus cycle. Hence, in each bus cycle, the bus master inhibits address incrementing on bus CSDAT during the bus cycle to allow all data for the move cycle to be transferred from the single point address location.

A source drives an active signal on source expansion address off boundary line SRC__XAOB when the source decodes a single point address type location, and the source's internal expansion address is not aligned with a natural boundary of communication source data bus CSDAT. Specifically, a single point address must be aligned with an address that matches the single point data transfer supported, i.e., for an 8-bit transfer, any address can be used; for a 16-bit transfer, an even address is assigned with the next odd address reserved (CSADR0=0); and for a 32-bit transfer, the address must be on a four-byte address boundary, (CSADR0 to CSADR8=0). See Table 4 below. For example for a word width communication source data For example, if the address on bus CSADR is even, data can be transferred either a byte or a word at a time. If the internal expansion address is odd, only a byte can be transferred at a time, because the internal expansion address is not aligned with the natural boundary for a word data transfer. Previously, this problem required a programmer to track previous accesses to the memory so that the internal expansion address was known, and the programmer could then transfer the appropriate data size.

In contrast, with this invention, the state of the signal on line MOV__WD is automatically changed when necessary by the signal on line SRC__XAOB so that the appropriate data size is transferred. This action is transparent to the programmer. Table 4 illustrates the assignment of an address of a single point address type location, and the effect of the signal on line SRC__XAOB.

TABLE 4

| CSADR0 | CDADR0 | SRC__ADINCDIS__L | SRC__XAOB | MOV__CYCLE | MOV__WORD |
|---|---|---|---|---|---|
| 0 | 0 | Inactive | Inactive | Active | Active |
| 1 | 1 | Inactive | Inactive | Active | Inactive |
| ≠CDADR0 | | Inactive | Inactive | Active | Inactive |
| 0 | | Active | Inactive | Active | Active |
| 0 | | Active | Active | Active | Inactive |

The first three rows of Table 4 are not for a single point address type location, because signal SRC__ADRINCDIS__L is inactive. Thus, when the source and destination address are aligned on a natural boundary for a word size data transfer as in row one, signal MOV__CYCLE is driven active. In row two, the source and destination address are aligned on an odd boundary which is not a natural boundary for a word size data transfer. Therefore, signal MOV__CYCLE is driven inactive. In row three, the source and destination addresses are not aligned on the same natural boundary and so only a byte at a time can be transferred. Therefore, signal MOV__CYCLE is driven inactive.

The fourth and fifth rows of Table 4 are for a single point address type location, because signal SRC__ADINCDIS__L is active. In row four, the source has not driven signal SRC_XAOB active and so the internal expansion address is aligned on an even address. Therefore, signal MOV_WORD is driven active. Conversely, in row five, the source has driven signal SRC_XAOB active and so the internal expansion address is not aligned on an even address. Therefore, signal MOV_WORD is driven inactive. The functionality illustrated in Table 4 is implemented in the hardware and so the programmer no longer has to track the internal expansion addresses. While in Table 4, a source module was used, the table is also directly applicable to a destination module.

The functionality illustrated in Table 4 permits may different combinations of automatic data transfers during a data move cycle. For example, data may be moved a byte at a time for the entire move cycle. Data may be moved a word at a time for the entire move cycle. The data transfer may start with a byte of data, and then the rest of the data is transferred a word at a time to complete the data move cycle. Alternatively, the data may be transferred a word at a time until the last data transfer which is a byte data transfer to end the data move cycle. The data transfer may start with a byte of data, and then transfer data a word at a time until the last data transfer which is a byte data transfer to end the data move cycle. This shifting of the size of the data transfer is controlled automatically based upon the conditions sensed as shown in Table 4 so that the programmer no longer needs to monitor the internal expansion addresses and select the appropriate data transfer size.

Similar to the actions described above for the source, a destination drives an active signal on destination expansion address off boundary line DST_XAOB when the destination decodes a single point address type location, and the address on bus CDADR is not pointing at the low byte of the single point address type location, i.e., the destination's internal expansion address is not aligned with a natural boundary of communication destination data bus CDDAT. For example, for an even address on bus CDADR, if the destination's internal expansion address is pointing at an odd byte, the destination drives an active signal on destination expansion address off boundary line DST_XAOB and signal MOV_WORD is driven inactive if it was active. Again, this feature eliminates the requirement that the programmer know the relationship between the destination internal expansion addresses and the natural boundary of the data buses.

When the signal on either source expansion address off boundary line SRC_XAOB, or destination expansion address off boundary line DST_XAOB is active, the current bus master transfers only bytes of data.

Figure 7:
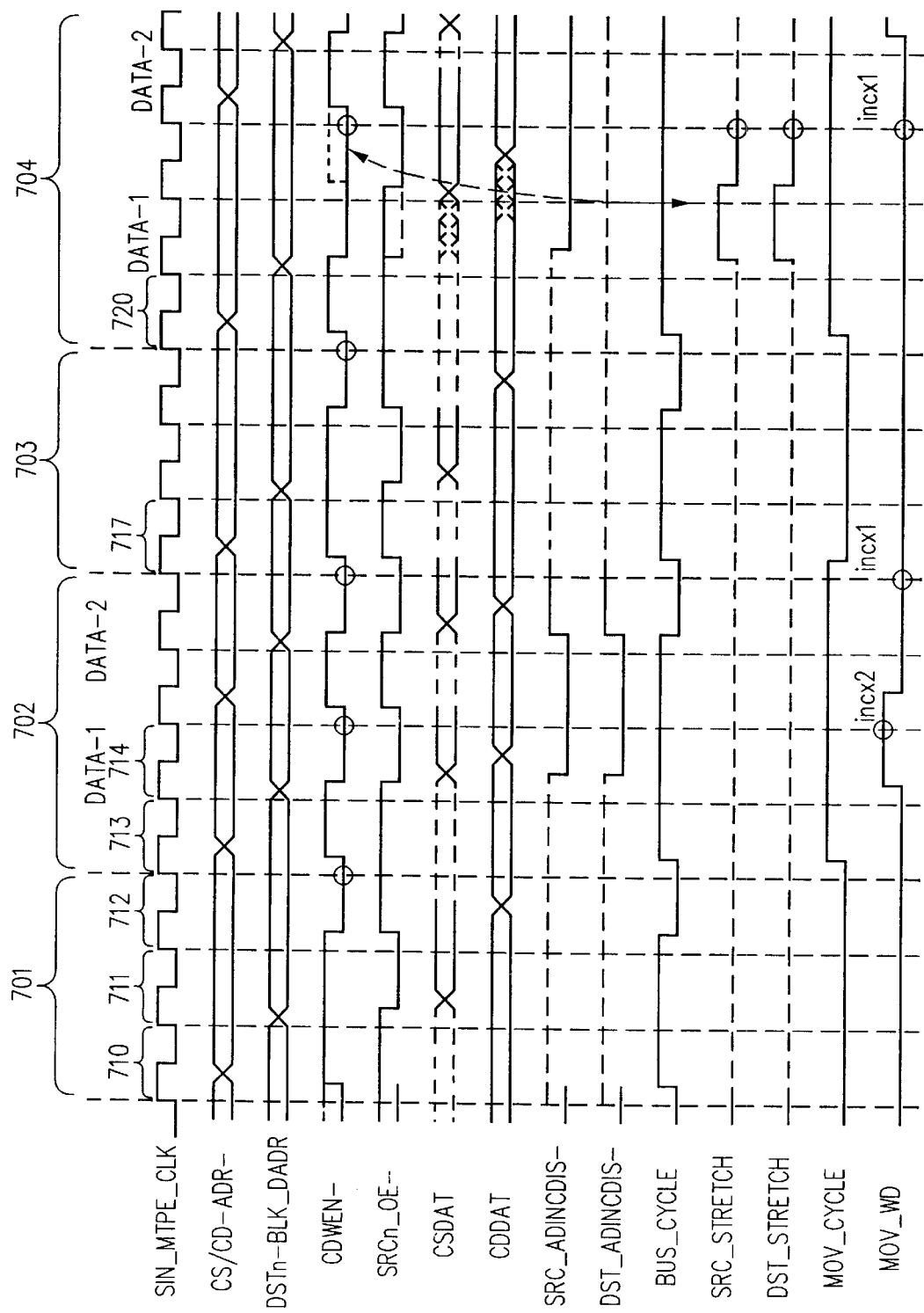
FIG. 7 is a timing diagram illustrating the operation of the cooperative communication bus of this invention.

FIG. 7 is a timing diagram for two and three bus clock cycle data transfers using cooperative communication bus CCB. FIG. 7 includes four bus cycles 701 to 704. Bus cycles 701 and 703 are three bus clock cycle data transfers while bus cycles 701 and 704 are two bus cycle data transfers.

Clock periods 710, 713, 717, and 720 are first clock periods of bus cycles 701, 702, 703, and 704, respectively. In this embodiment bus clock CCLK is clock signal SIN_MTPE_CLK. In each of the first clock periods, the active bus master, one of multitasking protocol engine MTPE, command management channel block CMC, or host interface block HST, supplies new addresses for the source and destination on communication source address bus CSADR and communication destination address bus CDADR, respectively. This is represented in FIG. 7 by the signal trace labeled CS/CD-ADR-. The signal traces for the source and destination addresses are combined to save space in the figure. The address on communication destination address bus CDADR drives a destination block destination address bus. The signal on the destination block destination address bus DSTn-BLK_DADR is shown in FIG. 7 where n is used to indicate a different source or destination location.

All sources and destinations decode the addresses to determine which should respond. When a destination module decodes the address on bus DSTn-BLK_DADR and determines that the address is for a location in that destination module, the module internally holds the address on bus DSTn-BLK_ADR, when required, for the current data transfer to guarantee proper storage of the data while decoding the next address on bus DSTn-BLK_ADR. As shown in FIG. 7, the destination holds the address on the rising edge of the next clock period in the bus cycle after the address initially is driven on the bus.

In each of bus cycles 701 to 704, the bus master of the bus cycle drives an inactive signal on communication data write enable line CDWEN_L in response to the rising edge of the first clock period, i.e., periods 710, 713, 717 and 720 respectively, in the bus cycle.

The source, with a storage location address that matches the address driven on communication source address bus CSADR, drives the data in the addressed location on communication source data bus CSDAT, in response to the rising edge of the second bus clock cycle in the bus cycle, i.e., the rising edge that signals the completion of the first clock period of the bus cycle. The source also drives an active signal on source address increment disable line SRC_ADINCDIS_L if the addressed storage location is a data port configuration, which was alternatively described above as a single point address location. The source also drives an active signal source stretch line SRC_STRETCH if more time is needed for the bus cycle. In bus cycle 701 neither of these signals are driven active.

The destination, with a storage location address that matches the address driven on communication source address bus CDADR, drives an active signal on source address increment disable line SRC_ADINCDIS_L if the addressed storage location is a data port configuration, which was alternatively described above as a single point address location, on the rising clock edge that completes the first clock period of the bus cycle. The destination also drives an active signal destination stretch line DST_STRETCH on the rising clock edge that completes the first clock period, if more time is needed for the bus cycle. In bus cycle 701 neither of these signals are driven active.

In response to the first rising clock edge of the bus cycle, the bus master drives an active signal on bus cycle line BUS_CYCLE, and an active signal on line MOV_CYCLE if appropriate as described above for FIG. 4. Since bus cycle 701 is not a move data transfer cycle, the signal on line MOV_CYCLE is not driven active. Also, since, in this embodiment, the bus master for cycle 701 only moves byte data, the signal on move word line MOV_WD remains inactive.

When no source provides data on communication source data bus CSDAT in response to the address on communication source address bus CSADR by either driving data on bus CSDAT in response to the clock edge ending the first clock period of the bus cycle, or driving an active signal on source stretch line SRC_STRETCH, the value on bus CSDAT is the value maintained by the bus hold cells on bus CSDAT. Also, when an addressed source drives an active signal on line SRC_STRETCH, the data from the source must be driven on bus CSDAT before, or with the active clock edge that inactivates the signal on line SRC_STRETCH.

Figure 8:
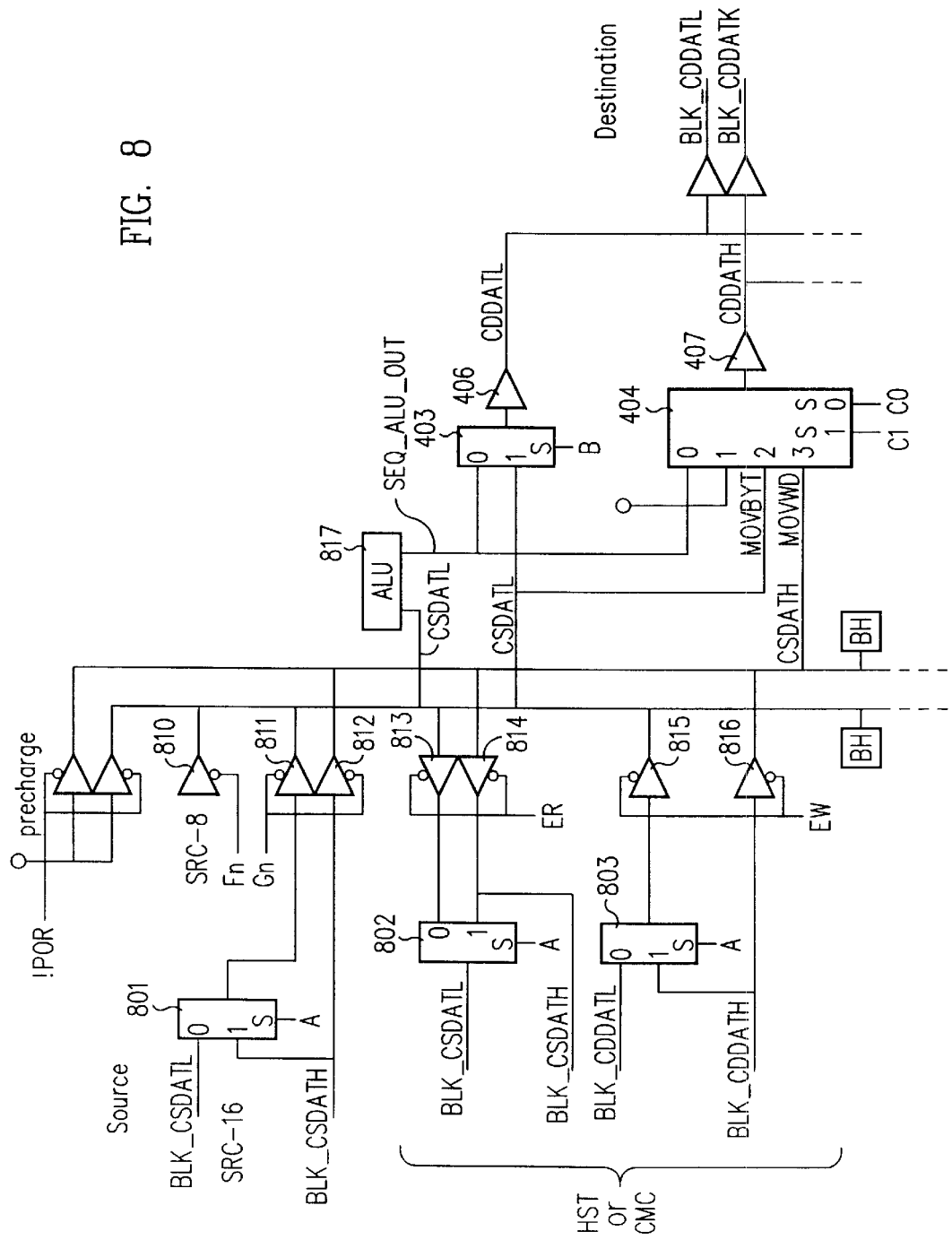
FIG. 8 is a schematic diagram of one implementation of variable sized data transfers from a source to a destination for both an ALU data transfer mode and a move data transfer mode.

One embodiment of the bus structure from the source to communication source data bus is illustrated in FIG. 8. In FIG. 8, the block containing the addressed source includes a block high-byte source data bus BLK_CSDATH and a block low-byte source data bus BLK_CSDATL. Table 5 defines the various signals used to control the multiplexers and tri-state buffers in FIG. 8.

TABLE 5

| Reference Numeral in FIG. 8 | Signal on Line |
|---|---|
| A (Select signal for 801 to 803) | Logic OR of least significant bit CSADR0 of source communication address bus CSADR and least significant bit IEA0 of internal expansion address index zero. |
| B | MOV_CYCLE |
| C0 | Logic AND of MOV_CYCLE and MOV_WD (See FIG. 4) |
| C1 | MOV_CYCLE |
| MOV_CYCLE | Logic OR of SEQ_MOVINST and PAUSEACK (See FIG. 4) |
| MOV_WD | MTPE bus master: SEQ_MOVINST & !CSADR0 & !CDADR0 & !CNT1 & !SRC_XA0B & !DST_XA0B<br>HST bus master: (HST16 & !HSTADR0 & CDADR0 & EW & !DST_XA0B) + (HST16 & !HSTADR0 & CDADR0 & ER & !SRC_XA0B)<br>CMC bus master: (!CMCADR0 & CDADR0 & !CNT1 & EW & !DST_XA0B) + (!CMCADR0) & !CDADR0 & !CNT1 & ER & !SRC_XA0B) |
| EW (Control signal for tri-state buffers 815 and 816) | HST bus master: PAUSEREQ & PAUSEACK & HST_PRI & WROP |
| | CMC bus master: PAUSEREQ & PAUSEACK & !HST_PRI & WROP |
| ER (Control signal for tri-state buffers 813 and 814) | HST bus master: PAUSEREQ & PAUSEACK & !HST_PRI & !WROP |
| | CMC bus master: PAUSEREQ & PAUSEACK & !HST_PRI & !WROP |
| Fn (Control signal for tri-state buffer 810) | Decode-8 |
| Gn (Control signal for tri-state buffers 811 and 8120) | Decode-16 |
| HST16 | (!CBE3 & !CBE2) + (!CBE1 & !CBE0) |

CBE3 to CBE0 are command byte enable signals on the PCI bus that indicate which data bytes contain valid data for each data transfer(low active signals). When a pair are both low, sixteen bits are being transferred. Signal HST_PRI is active when only the host bus master has requested access to bus CCB, or when both the host bus master and the command management channel bus master request access to bus CCB in the same bus cycle.

In Table 5, a plus sign is a logic OR function; an ampersand is a logic AND function; and an exclamation mark means not. Signal WROP is driven active for a write operation. A reference numeral that includes ADR0 means the least significant bit of the bus. Signal CNT1 indicates an odd byte so that a byte data transfer is required. Signal CNTnn is the byte count field in a MTPE move instruction and has a range of 1 to 127 bytes.

The addressed source couples block source data buses BLK_CSDATL and BLK_CSDATH to communication source data buses CSDATL and CSDATH, respectively in response to the rising clock edge that completes the first bus clock period 710 in bus cycle 701. Also, when a dual-port RAM is the source for read-modify-write ALU accesses of one location (the address on bus CSADR is the same as that on bus CDADR) that is performed by multitasking protocol engine MTPE, write data feed through to read data must be prevented. As shown in FIG. 7, an active signal is driven on source internal output enable line SCRn_OE- for only one clock period. This signal is driven active low in response to the rising edge of the second bus clock cycle and inactive on the next clock cycle. The communication source bus hold circuits 411 and 412 (FIG. 4) latch the data until the data is changed in the next access.

In response to the rising edge that completes the second clock period 711, the bus master drives an active signal on communication data write enable line CDWEN_L and an inactive signal on bus cycle line BUS CYCLE. In response to the active signal on communication data write enable line CDWEN_L, the inactive signals on lines SRC_STRETCH and DST_STRETCH, and the active clock edge completing third bus clock period 712 of bus cycle 701, i.e., the rising edge of bus clock period 713, the destination stores the data on bus CDDATL, or the data on bus CDDATH, or the data on both buses to internal registers using internal block buffered buses BLK_CDDATL and/or BLK_CDDATH (FIG. 8).

In response to the active signal on communication data write enable line CDWEN_L, and an inactive signal on source stretch line SRC_STRETCH, a source data port increments the internal expansion address as shown in TABLE 6.

TABLE 6

| MOV_WD | CSADR0 or block IEA0 | Source 16 output (FIG. 8) | Address Increment |
|---|---|---|---|
| 0 | 0 | BLK_CSDATL on CSDATL, BLK_CSDATH on CSDATH | X1 |
| 0 | 1 | BLK_CSDATH on CSDATL, BLK_CSDATH on CSDATH | X1 |
| 1 | 0 | BLK_CSDATL on CSDATL, BLK_CSDATH on CSDATH | X2 |

In response to the active signal on communication data write enable line CDWEN_L, and an inactive signal on destination stretch line DST_STRETCH, a destination data port increments the internal expansion address when the data on bus CDDAT is stored as shown in TABLE 7.

TABLE 7

| MOV_WD | CDADR0 or block IEA0 | Destination 16 store (FIG. 8) | Address Increment |
|---|---|---|---|
| 0 | 0 | Store BLK_CSDATL to addressed low-byte register | X1 |
| 0 | 1 | Store BLK_CSDATH to addressed high-byte register | X1 |
| 1 | 0 | Store BLK_CSDATL to addressed low-byte register, Store BLK_CSDATH to addressed high-byte register | X2 |

Bus cycle 703 is similar to bus cycle 701 and so is not considered further. Bus cycle 702 is a move data transfer bus cycle with two data phases. The actions in response to rising edge of first clock period 713 are equivalent to those described above for first clock period 710 of bus cycle 701. However, in addition, the signal on move cycle line MOV_CYCLE is driven active by the bus master.

On the rising clock edge that completes first bus clock period 713, the bus master drives an active signal on communication data write enable line CDWEN_L and keeps bus cycle signal BUS_CYCLE active. Also, both the addressed location in the source and the addressed location in the destination are a single point address storage location. Consequently, the source drives an active signal on source address increment disable line SRC_ADINCDIS-. The destination drives an active signal on destination address increment disable line DST_ADINCDIS-. Both of these signals are held active until the signal on line bus cycle line BUS_CYCLE goes inactive.

In bus cycle 702, the bus master drives an active signal on communication data write enable line CDWEN_L in response to the rising edge that completes first bus clock cycle 713 and drives an active signal on move word line MOV_WD to indicate that a data word is being transferred.

The second data transfer phase is equivalent to that just described, except the move count value is one which causes signal MOV_WD to be inactivated and so only a data byte is transferred. This transfer decrements the count value to zero and so ends the move transfer. The second data transfer phase completes second bus cycle 702. The last bus cycle 704 is similar to bus cycle 702, except both the source and destination require additional time to complete the first data transfer phase. Consequently, as described above, and shown in FIG. 7, the source and destination drive an active signal on source stretch line SRC_STRETCH and on destination stretch line DST_STRETCH, respectively. Thus, as shown in the FIG. 7, the first data transfer phase of bus cycle 704 is three bus clock cycles in length. Also, the source is a single point address memory location, while the destination is not.

Figure 9:
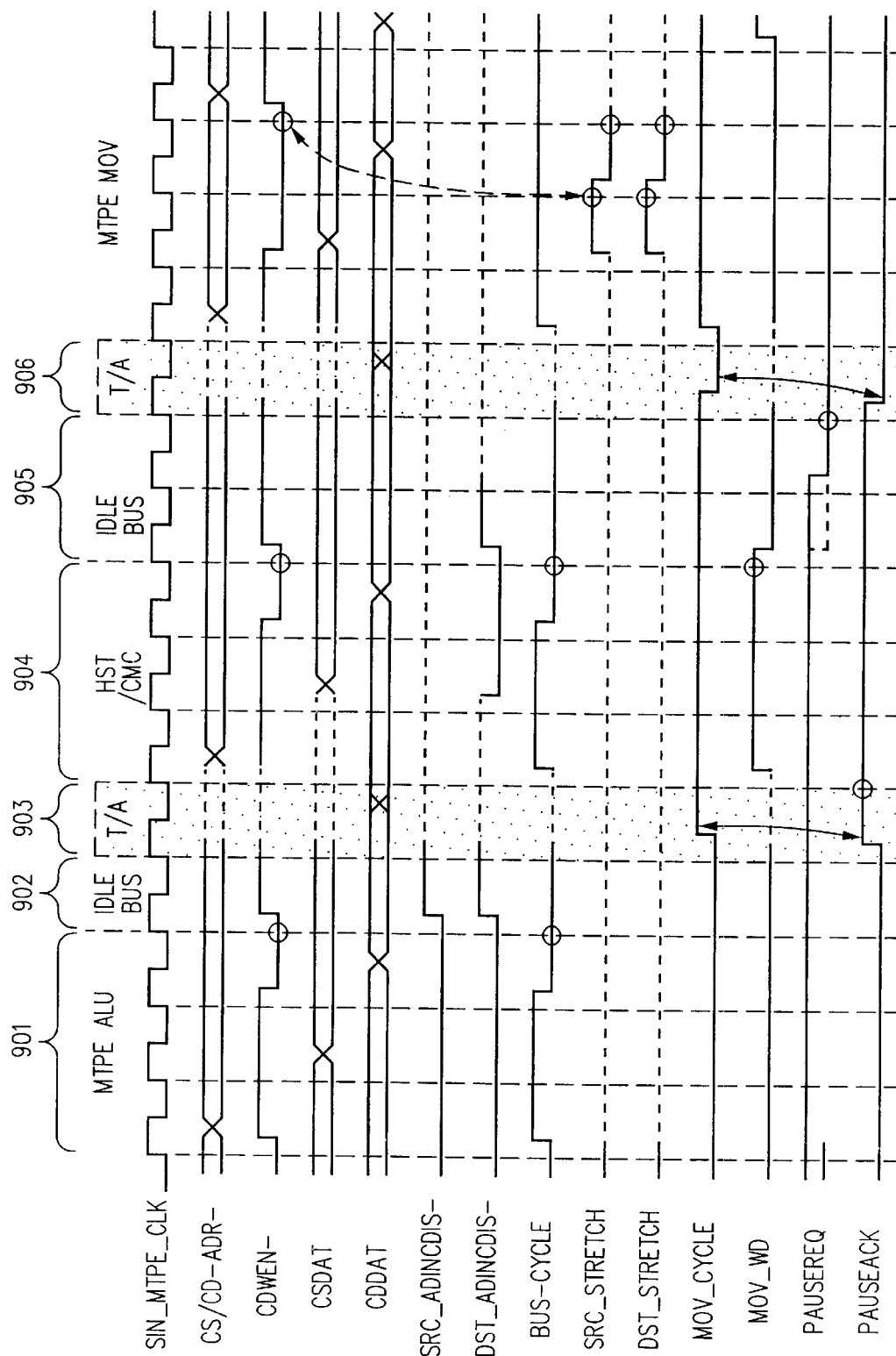
FIG. 9 is a timing diagram illustrating bus master changes on the cooperative communication bus of this invention.

FIG. 9 a timing diagram for a bus master exchange on cooperative communication bus CCB for different bus access cycles. Each of the reference numerals for the various signals shown in FIG. 9, and the corresponding action of the signals has been described above and that description is incorporated herein by reference. In bus access phase 901, multitasking protocol engine MTPE is performing an ALU bus access cycle. Also, another master has driven an active signal on pause request line PAUSEREQ.

In response to active signal PAUSEREQ, multitasking protocol engine MTPE completes ALU bus access cycle 901. Multitasking protocol engine MTPE returns cooperative communication bus CCB to an idle state for one bus clock period 902. In the next clock period 903, multitasking protocol engine MTPE tri-states cooperative communication bus CCB, and drives an active signal on line PAUSEACK, which in turn drives signal MOV_CYCLE active (See FIG. 4 also).

The bus master that drove signal PAUSEREQ active, either host interface block HST or command management channel block CMC, senses the active signal on line PAUSEACK and drives cooperative communication bus CCB during bus cycle access 904. The various signals driven on cooperative communication bus CCB during bus access cycle 904, as illustrated in FIG. 9, are similar to those described above and so will be apparent to those of skill in the art.

Upon completion of bus access cycle 904, the bus master returns bus CCB to the idle state for a minimum of one bus clock cycle and then drives signal PAUSEREQ inactive one clock period later. The releasing bus master tri-states bus drivers 815 and 816 to complete of idle bus access cycle 905. Idle bus access cycle 905 is two bus clock cycles in duration in this embodiment.

Multitasking protocol engine MTPE senses that signal PAUSEREQ has gone inactive and takes signal PAUSEACK inactive. After a minimum of one bus clock cycle after signal PAUSEREQ goes inactive, multitasking protocol engine MTPE drives cooperative communication bus CCB as bus master with a new bus access cycle 907.

The above embodiments of the invention are illustrative only of the principles of this invention are not intended to limit the invention to the particular examples presented. In particular, the principles of this invention will work with any size data and address buses. Further, only subsets of the lines in the control bus could be used in a particular application.

I claim:

1. In an integrated circuit having a plurality of modules coupled to each other by an internal communication bus having a control bus, a method comprising:

driving an address of a storage location in a module on an address bus, within said internal communication bus, by a bus master; and driving an active signal on an address increment disable line in said control bus by said module upon said addressed storage location being a single point address type memory.

2. The method of claim 1 further comprising:

inhibiting changing said address by said bus master in response to said active signal on said address increment disable line.

3. The method of claim 1 wherein said module is a source module.

4. The method of claim 1 wherein said module is a destination module.

5. In an integrated circuit having a plurality of modules coupled to each other by an internal communication bus having a control bus, a method comprising:

driving an address of a storage location in a module on an address bus, within said internal communication bus, by a bus master;

driving an active signal on an address increment disable line in said control bus by said module upon said addressed storage location being a single point address type memory; and driving an active signal on an expansion address off boundary line in said control bus by said module when an internal expansion address of said module is not aligned with a natural boundary of a data bus of said internal communication bus.

6. In an integrated circuit having a plurality of modules coupled to each other by an internal communication bus having a control bus, a method comprising:

driving an active bus cycle signal on said control bus to indicate a start of a bus cycle; and driving said bus cycle signal inactive to indicate an end of said bus cycle that contains at least one data transfer including any number of data phases wherein said bus cycle signal remains active until said driving said bus cycle signal inactive occurs.

7. The method of claim 6 further comprising:

selectively driving an active signal on a data transfer size line in said control bus to indicate a size of data to be transferred over said internal communication bus.

8. The method of claim 6 wherein said bus cycle has a period.

9. The method of claim 8 wherein said period is two bus clock periods.

10. The method of claim 8 wherein said period is one of said two bus clock periods and three bus clock periods.

11. The method of claim 8 wherein said period is three bus clock periods.

12. In an integrated circuit having a plurality of modules coupled to each other by an internal communication bus having a control bus, a method comprising:

driving an active bus cycle signal on said control bus to indicate a start of a bus cycle;

driving said bus cycle signal inactive to indicate an end of said bus cycle that contains at least one data transfer; and driving an active move cycle signal on said control bus only when a data transfer over said bus does not utilize an arithmetic and logic unit (ALU) in said integrated circuit.

13. The method of claim 12 further comprising:

selectively driving an active signal on a data transfer size line in said control bus to indicate a size of data to be transferred over said internal communication bus.

14. The method of claim 12 wherein said bus cycle has a period.

15. The method of claim 14 wherein said period is two bus clock periods.

16. The method of claim 14 wherein said period is one of said two bus clock periods and three bus clock periods.

17. The method of claim 14 wherein said period is three bus clock periods.

18. In an integrated circuit having a plurality of modules coupled to each other by an internal communication bus having a control bus, a method comprising:

selectively coupling a sequencer output bus having a first width to one of a first destination data bus having said first width and a second data destination data bus having said first width wherein said first and second destination data buses comprise a communication destination data bus of said internal communication bus; and selectively coupling a source data bus having said first width to one of said first destination data bus and said second data destination data bus wherein said source data bus is included in a communication source data bus of said internal communication bus.

* * * * *